(12) United States Patent
Wroblewski et al.

(10) Patent No.: US 7,584,024 B2
(45) Date of Patent: Sep. 1, 2009

(54) METHOD AND APPARATUS FOR OPTIMIZING OPERATION OF A POWER GENERATING PLANT USING ARTIFICIAL INTELLIGENCE TECHNIQUES

(75) Inventors: David Wroblewski, Mentor, OH (US); Alexander M. Katrompas, Concord, OH (US); Neel J. Parikh, Richmond Heights, OH (US)

(73) Assignee: Pegasus Technologies, Inc., Mentor, OH (US)

( * ) Notice: Subject to any disclaimer, the term of this patent is extended or adjusted under 35 U.S.C. 154(b) by 252 days.

(21) Appl. No.: 11/053,734

(22) Filed: Feb. 8, 2005

(65) Prior Publication Data

US 2006/0178762 A1    Aug. 10, 2006

(51) Int. Cl.
*G05B 13/02* (2006.01)
(52) U.S. Cl. .............................. 700/300; 700/36; 700/46
(58) Field of Classification Search .................. 700/30, 700/36, 46
See application file for complete search history.

(56) References Cited

U.S. PATENT DOCUMENTS

| | | | | |
|---|---|---|---|---|
| 3,898,441 A * | 8/1975 | Davis et al. .................. 700/287 |
| 5,167,009 A | 11/1992 | Skeirik ......................... 395/27 |
| 5,181,482 A * | 1/1993 | Labbe et al. ................. 122/392 |
| 5,212,765 A | 5/1993 | Skeirik ......................... 395/11 |
| 5,282,261 A | 1/1994 | Skeirik ......................... 395/22 |
| 5,386,373 A | 1/1995 | Keeler et al. ................. 364/577 |
| 5,781,432 A | 7/1998 | Keeler et al. ................. 364/164 |
| 5,933,345 A | 8/1999 | Martin et al. ................ 364/164 |
| 6,243,696 B1 | 6/2001 | Keeler et al. .................... 706/21 |
| 6,278,899 B1 | 8/2001 | Piche et al. ...................... 700/44 |
| 6,325,025 B1 | 12/2001 | Perrone ....................... 122/379 |
| 6,425,352 B2 | 7/2002 | Perrone ....................... 122/379 |
| 6,438,430 B1 | 8/2002 | Martin et al. ................... 700/28 |
| 6,725,208 B1 | 4/2004 | Hartman et al. ................ 706/23 |
| 6,736,089 B1 * | 5/2004 | Lefebvre et al. ............. 122/379 |
| 6,738,677 B2 | 5/2004 | Martin et al. ................... 700/44 |
| 7,117,046 B2 * | 10/2006 | Boyden et al. ................. 700/52 |
| 2004/0244729 A1 | 12/2004 | Lefebvre et al. ............. 122/379 |
| 2004/0249480 A1 | 12/2004 | Lefebvre et al. .............. 700/31 |

OTHER PUBLICATIONS

Nakoneczny, G., Conrad, R., et al., "Boiler Performance Improvement Due to Intelligent Sootblowing Utilizing Real-Time Boiler Modeling," in Proceedings of Power-Gen International 2004, Orlando, FL, Nov. 30-Dec. 2, 2004.*

Sarunac et al., "Sootblowing Optimization Helps Reduce Emissions form Coal-Fired Utility Boilers," Proceedings of the 2003 MEGA Symposium, Washington D.C., May 19-22, 2003.*

(Continued)

*Primary Examiner*—Albert DeCady
*Assistant Examiner*—Tejal Gami
(74) *Attorney, Agent, or Firm*—Kusner & Jaffe

(57) ABSTRACT

A method and apparatus for optimizing the operation of a power generating plant using artificial intelligence techniques. One or more decisions D are determined for at least one consecutive time increment, where at least one of the decisions D is associated with a discrete variable for the operation of a power plant device in the power generating plant. In an illustrated embodiment, the power plant device is a soot cleaning device associated with a boiler.

26 Claims, 8 Drawing Sheets

OTHER PUBLICATIONS

Nakoneczney et al., "Implementing B&W's Intelligent Sootblowing system at MidAmerican Energy Company's Louisa Energy Center Unit 1," Western Fuels conference, Aug. 12-13, 2002.*

Rhode et al., "Tampa Electric Neural Network Sootblowing," DOE Award No. DE-FC26-02NT41425, Feb. 2003.*

N. Parikh, M. Rhode "Combustion and Sootblowing Optimization using Advanced Instrumentation, Control and Artificial Intelligence Techniques," in Proceedings of the 29$^{th}$ International Technical Conference on Coal Utilization & Fuel Systems, Clearwater, Florida, USA, Apr. 18-23, 2004.

M. Rhode, N. Parikh, "Tampa Electric's Neural Network Based Intelligent Sootblowing," in Proceedings of the 2003 Power-Gen International Conference, Las Vegas, Nevada, USA, Dec. 9-11, 2003.

M. Rhode, N. Parikh, "Tampa Electric's Neural Network Based Intelligent Sootblowing," in Proceedings of the EPRI's 4th Intelligent Sootblowing Workshop and Exposition, Houston, Texas, USA, Mar. 19-21, 2002.

Nakoneczny, G., Conrad, R., et al., "Boiler Performance Improvement Due to Intelligent Sootblowing Utilizing Real-Time Boiler Modeling," in Proceedings of Power-Gen International 2004, Orlando, FL; Nov. 30-Dec. 2, 2004.

Duane Hill, "FEGT System Tests and Overview of ISB at JP Madgett Station" EPRI's Fourth Intelligent Sootblowing Workshop Proceedings, Palo Alto, CA, Mar. 19-21, 2002.

Neel Parikh and Brad Radl "Intelligent Sootblowing—Pegasus Perspective" EPRI's Twelfth Heat Rate Improvement Conference Proceedings, Palo Alto, CA, Jan. 2001 pp. 378-387.

M. Rhode, N. Parikh, B. Radl, "Neural Net Systems—Sootblowing Optimization Using Advanced Techniques," in Proceedings of the Electric Power 2003, 5th Annual Conference and Exhibition, Houston, Texas, USA, Mar. 4-6, 2003.

* cited by examiner

METHOD AND APPARATUS FOR OPTIMIZING OPERATION OF A POWER GENERATING PLANT USING ARTIFICIAL INTELLIGENCE TECHNIQUES

STATEMENT OF GOVERNMENT INTEREST

This invention was made with Government support under Contract No. DE-FC26-02NT41425 awarded by the U.S. Department of Energy. The Government has certain rights in the invention, including a paid-up license and the right, in limited circumstances, to require the patent owner to license others on reasonable terms.

FIELD OF THE INVENTION

The present invention relates generally to the operation of a power generating plant, and more particularly to a method and apparatus for optimizing the operation of a power generating plant using artificial intelligence techniques.

BACKGROUND OF THE INVENTION

In a conventional fossil fuel-fired (e.g., coal-fired) power generating unit a fossil fuel/air mixture is ignited in a boiler. Large volumes of water are pumped through tubes inside the boiler, and the intense heat from the burning fuel turns the water in the boiler tubes into high-pressure steam. The high-pressure steam from the boiler passes into a turbine comprised of a plurality of turbine blades. Once the steam hits the turbine blades, it causes the turbine to spin rapidly. The spinning turbine causes a shaft to turn inside a generator, creating an electric potential. It should be understood that as used herein, the terms "power plant" and "plant" refer to a group comprised of one or more power generating units. Each power generating unit includes systems for generation of electrical power.

Boiler combustion or other characteristics of a fossil fuel-fired power generating unit, are influenced by dynamically varying plant parameters including, but not limited to, operating conditions, boiler configuration, slag/soot deposits, load profile, fuel quality and ambient conditions. Changes to the business and regulatory environments has increased the importance of dynamic factors such as fuel variations, performance criteria, emissions control, operating flexibility and market driven objectives (e.g., fuel prices, cost of emissions credits, cost of electricity, etc.).

In most cases, efficient combustion and soot cleaning are treated as separate operational issues, typically having separate control systems, that may be evaluated and adjusted on a periodic basis under controlled settings. The high interrelationship between efficient combustion and soot cleaning demands an optimal combination of dynamically varying plant parameters and cleanliness strategies to achieve the most benefits. The techniques are best to be adaptive to accommodate volatile operating conditions and fuel variations, and must be automated to provide both tangible benefits around-the-clock and to minimize burdening power plant operators.

One of the effects of burning fossil fuels in boilers is the buildup of soot and slag on the heat transfer surfaces within the boiler. Soot and slag buildup causes a redistribution/reduction of the heat transferred, and hence heat absorbed across various sections of the boiler. In addition, it affects furnace gas flows that, for example, may cause metal temperature hot spots, imbalances in reheat or superheat sections, or possible tube erosion. This condition, if left uncontrolled, often leads to a heat rate penalty, increased NOx emissions and reduced tube/metal life. Adverse heat rate impacts arise from numerous factors including, but not limited to: (1) incomplete combustion or related effect, (2) unbalanced steam generation, (3) excessive use of desuperheater sprays, (4) high exit gas temperatures, (5) forced deslagging events, (6) increased gas flow losses, as well as (7) excessive use of soot cleaning energy. It is well documented that thermal NOx generation is largely a function of temperatures within and around the combustion zone. As the boiler sections become excessively slagged, heat transfer ability is impaired which leads to higher temperatures and higher NOx levels.

As used herein, "heat rate" refers to the number of units of total thermal input (i.e., fuel heat input) required to generate a specific amount of electrical energy (i.e., electrical power output). Heat rate provides a measure of thermal efficiency and is typically expressed in units of Btu/kWh in North America.

Incorrect accumulation of soot (i.e., fouling) of the boiler leads to poor efficiencies due to the fact that heat that could normally be transferred to the working transfer medium remains in the flue gas stream and exits to the environment without beneficial use, or transfers its energy in a less desired, less efficient portion of the power generating unit. This loss in efficiency translates to higher consumption of fuel for equivalent levels of electricity generation, which in turn may produce more gaseous, particulate, and other emissions. Another less obvious problem owing to fouling is the intensity of peak temperatures within and around a combustion zone. Total NOx generation is often a function of fuel-bound, prompt and thermal NOx. The levels of oxygen predominately influence fuel-bound NOx, which may comprise 20%-40% of the total NOx generated. Thermal NOx, which may comprise approximately 20%-50% of the total NOx, is a function of temperature. As the fouling of the boiler increases and the rate of heat transfer decreases, peak temperature increases, and so does the thermal NOx production.

Due to the composition of the fossil fuel, particulate matter (PM) is also a by-product of fuel combustion. Modern day boilers may be fitted with electrostatic precipitators (ESP) to aid in the collection of particulate matter. Although extremely efficient, these devices are sensitive to rapid changes in inlet mass concentration as well as total mass loading. Without extreme care and due diligence, excursions or excessive soot can overload an ESP, resulting in the release of high levels of PM. Furthermore, the ESP efficiency can be adversely affected by an increase in gas temperature at the point of particulate collection.

Fossil fuel-fired power generating units employ soot cleaning devices including, but not limited to, sootblowers, sonic devices, water lances, and water cannons or hydro-jets. These soot cleaning devices use steam, water or air to dislodge slag and clean surfaces within a boiler. The number of soot cleaning devices on a given power generating unit can range from several to over a hundred. Random manual, manual sequential, and time-based sequencing of soot cleaning devices have been the traditional methods employed to improve cleanliness within boilers. These soot cleaning devices are generally automated and are initiated by a master control device. In most cases, the soot cleaning devices are activated based on predetermined criteria, established protocols, sequential methods, time-based approaches, operator judgment, or combinations thereof. These methods result in indiscriminate cleaning of the entire boiler or sections thereof, regardless of whether sections are already clean. The time-based methods are now slowly being replaced by criteria-based methods, such as cleaning the boiler in accordance with maintaining certain cleanliness levels.

Traditional methods of soot cleaning, even when they are effective in assuring that a boiler is clean, fail to optimize the heat transfer rates therein, so as to maximize its operation relative to emissions and power generating unit performance. Traditional methods may also lead to accelerated tube failure through erosion, (blowing on clean surfaces), or metal fatigue (creating large temperature differentials when a large layer of soot has built up and is cleaned).

It may appear that the goals or objectives of soot cleaning are simple and easy to ascertain, i.e., maintain the boiler heat transfer surfaces in a clean state so as to maximize heat transfer from the combustion gas side to the steam/water side of the boiler. However, the effects of boiler soot cleaning are complex and interrelated with combustion and/or power generating unit characteristics. There are multiple trade-offs between achieving a cleaner surface and the cost of operating a soot cleaning device. Furthermore, cleaning the waterwalls in the lower furnace has the desirable effect of improving heat transfer in the steam generation circuits leading to increased steam production. It also results in a reduced Furnace Exit Gas Temperature (FEGT) and reduced heat transfer in the convection pass and possible reductions in spray flows. Thus, main steam and reheat steam temperatures are reduced with an associated cost penalty manifested as an increase in unit heat rate. Trade-offs occur as furnace walls can become too clean and result in non-optimal steam temperature as a result of excessive heating in the furnace area and lead to either an effect of excessive steam attemperation spray, or conversely insufficient temperatures in one or another steam paths. Both affects can result from over cleaning or under cleaning of a furnace area.

Additionally, trade-offs must be considered when cleaning the convective pass of the boiler. Under some operating conditions, convective pass cleaning may necessitate excessive desuperheating spray in order to maintain superheat or reheat steam temperatures within operational limits. This directly results in an increase in unit heat rate. Hence, soot cleaning should be considered within the wider context of overall optimization of power generating units including the distribution of unit heat transfer as well as combustion or other system optimization including affects such as heat rate, NOx, CO, PM, metal fatigue, erosion, keeping the power generating unit in control range (e.g. spray flows or burner tilts), etc.

Operators of power plants are challenged with a number of non-linear and conflicting objectives, some of which are discussed above, while ensuring that power generating units are stable and capable of meeting system dispatch requirements. Simultaneously optimizing the objectives of NOx, PM, heat rate, opacity, or other requirements is difficult and unrealistic for a control room operator to do manually, even more so when that operator is also required to maintain control of the balance of the power generating unit's equipment. Owing to business demands and regulatory issues, present day boilers are subject to volatile changes in operation and fuel types or blends.

In recent years, the industry has been introduced to a number of "Intelligent" Rule-Based systems that derive their knowledge base from operator experiences, static design data, general thermal principles and periodic testing. Rule-based systems are only as good as the rules that drive them and established rules alone cannot accommodate the diverse set of operating conditions that may be encountered on a daily basis. Furthermore, time or rule-based systems alone are not the best answer due to the complexity of the individual components, combinations thereof and the desire to satisfy multiple objectives in a dynamic real-time environment. While the rule-based systems are an improvement over conventional hard-coded techniques, these techniques do not deal with some of the dynamic and transitional operational characteristics of present day boilers.

Examples of some current "Intelligent" Rule-Based systems for soot cleaning will now be briefly described. Advise IT Sootblowing Advisor module from ABB Inc. calculates sectional surface cleanliness values in real time, as well as the temperature of gas entering each section. The thermal principles based model is configured/tuned to unit-specific boiler data. The results obtained from this module support power plant operators and engineers in optimizing current power plant sootblowing strategy. EtaPRO software package from General Physics provides calculated cleanliness data (i.e., cleanliness parameters) for different zones in a boiler. The use of such cleanliness data may be site and application specific. A water cannon system from Clyde Bergemann provides calculated heat flux value for each zone mapped by the system. The use of such calculated heat flux data may be site and application specific.

The present invention provides a method and apparatus for optimizing the operation of a power generating plant using artificial intelligence techniques that overcome these and other deficiencies of the prior art.

SUMMARY OF THE INVENTION

In accordance with the present invention, there is provided a method for optimizing the operation of a power generating plant having a plurality of power plant devices, the method comprising: generating a model that models operation of the power generating plant, said model receiving a plurality of input parameters associated with operation of the power generating plant, and generating one or more output parameters in response to said plurality of input parameters, wherein each said output parameter is associated with a goal for the power generating plant; determining for one or more consecutive time increments, one or more decisions D that realize a desired goal for the power generating plant, wherein at least one of said decisions D is associated with at least one discrete variable for operation of a power plant device based upon said model; and operating the power generating plant in accordance with at least one of the decisions D.

In accordance with another aspect of the present invention, there is provided a method for operating a power generating plant including a plurality of power plant devices, the method comprising: providing a model of the operation of the power generating plant; determining at least one decision D that realizes a desired goal for the power generating plant for each of one or more time increments, wherein at least one of said decisions D is associated with at least one discrete variable for operation of a power plant device based upon said model; and selecting at least one of said decisions D to optimize operation of the power generating plant.

In accordance with still another aspect of the present invention, there is provided a system for optimizing the operation of a power generating plant comprised of a plurality of power plant devices, the system comprising: means for generating a model that models operation of the power generating plant, said model receiving a plurality of input parameters associated with operation of the power generating plant, and generating one or more output parameters in response to said plurality of input parameters, wherein each said output parameter is associated with a goal for the power generating plant; means for determining for one or more consecutive time increments, one or more decisions D that realize a desired goal for the power generating plant, wherein at least one of said decisions D is associated with at least one discrete variable for operation of a power plant device based upon said model; and means for operating the power generating plant in accordance with at least one of the decisions D.

In accordance with still another aspect of the present invention, there is provided a system for operating a power generating plant including a plurality of power plant devices, the system comprising: a model of the operation of the power generating plant; means for determining at least one decision D that realize a desired goal for the power generating plant for each of one or more time increments, wherein at least one of said decisions D is associated with at least one discrete variable for operation of a power plant device based upon said model; and means for selecting at least one of said decisions D to optimize operation of the power generating plant.

In accordance with still another aspect of the present invention, there is provided a method for optimizing the operation of at least one soot cleaning device group in a power generating plant, wherein each said soot cleaning device group is comprised of one or more soot cleaning devices, the method comprising: generating a model that models operation of the power generating plant, said model receiving a plurality of input parameters associated with operation of the power generating plant, and generating one or more output parameters in response to said plurality of input parameters, wherein each said output parameter is associated with a goal for the power generating plant; repeatedly adjusting at least one of said plurality of input parameters received by the model, to obtain output parameters that achieve a desired goal for the power generating plant; determining one or more decisions D for activation of a soot cleaning device group that is associated with achievement of said desired goal for the power generating plant; ranking the decisions D in accordance with a predetermined criteria; and selecting at least one soot cleaning device group for activation at the present time in accordance with said ranked decisions D.

In accordance with yet another aspect of the present invention, there is provided a system for optimizing the operation of at least one soot cleaning device group in a power generating plant, wherein each said soot cleaning device group is comprised of one or more soot cleaning devices, the system comprising: means for generating a model that models operation of the power generating plant, said model receiving a plurality of input parameters associated with operation of the power generating plant, and generating one or more output parameters in response to said plurality of input parameters, wherein each said output parameter is associated with a goal for the power generating plant; an optimizer for repeatedly adjusting at least one of said plurality of input parameters received by the model, to obtain output parameters that achieve a desired goal for the power generating plant; means for determining one or more decisions D for activation of a soot cleaning device group that is associated with achievement of said desired goal for the power generating plant; means for ranking the decisions D in accordance with a predetermined criteria; and means for selecting at least one soot cleaning device group for activation at the present time in accordance with said ranked decisions D.

An advantage of the present invention is the provision of a soot cleaning optimization system and method that uses soot cleaning calculations based on actual operating data acquired from soot cleaning device control system(s).

Another advantage of the present invention is the provision of a soot cleaning optimization system and method that does not use cleanliness information parameters for soot cleaning calculations.

Another advantage of the present invention is the provision a soot cleaning optimization system and method that can optimize soot cleaning for simultaneous and non-complimentary goals.

Another advantage of the present invention is the provision of a soot cleaning optimization system and method that has goals that can be altered to enhance buildup of soot in strategic areas, thereby achieving optimal performance faster after an a-periodic event such as an outage.

Still another advantage of the invention is the provision of a soot cleaning optimization system and method that has the ability to include natural slag events.

Still another advantage of the present invention is the provision of a soot cleaning optimization system and method that optimally determines when and which soot cleaning device(s) to select and signal for activation.

Still another advantage of the present invention is the provision of a path forecasting system that uses a combination of multiple artificial intelligence techniques.

Still another advantage of the present invention is the provision of a path forecasting system that use a neural network (or other modeling component) as a modeling tool applied within a decision tree structure.

Yet another advantage of the present invention is the provision of a method and apparatus for optimizing the operation of a power generating plant wherein one or more decisions D are determined for at least one consecutive time increment, where at least one of the decisions D is associated with a discrete variable for operation of a power plant device.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF A PREFERRED EMBODIMENT

Figure 1:
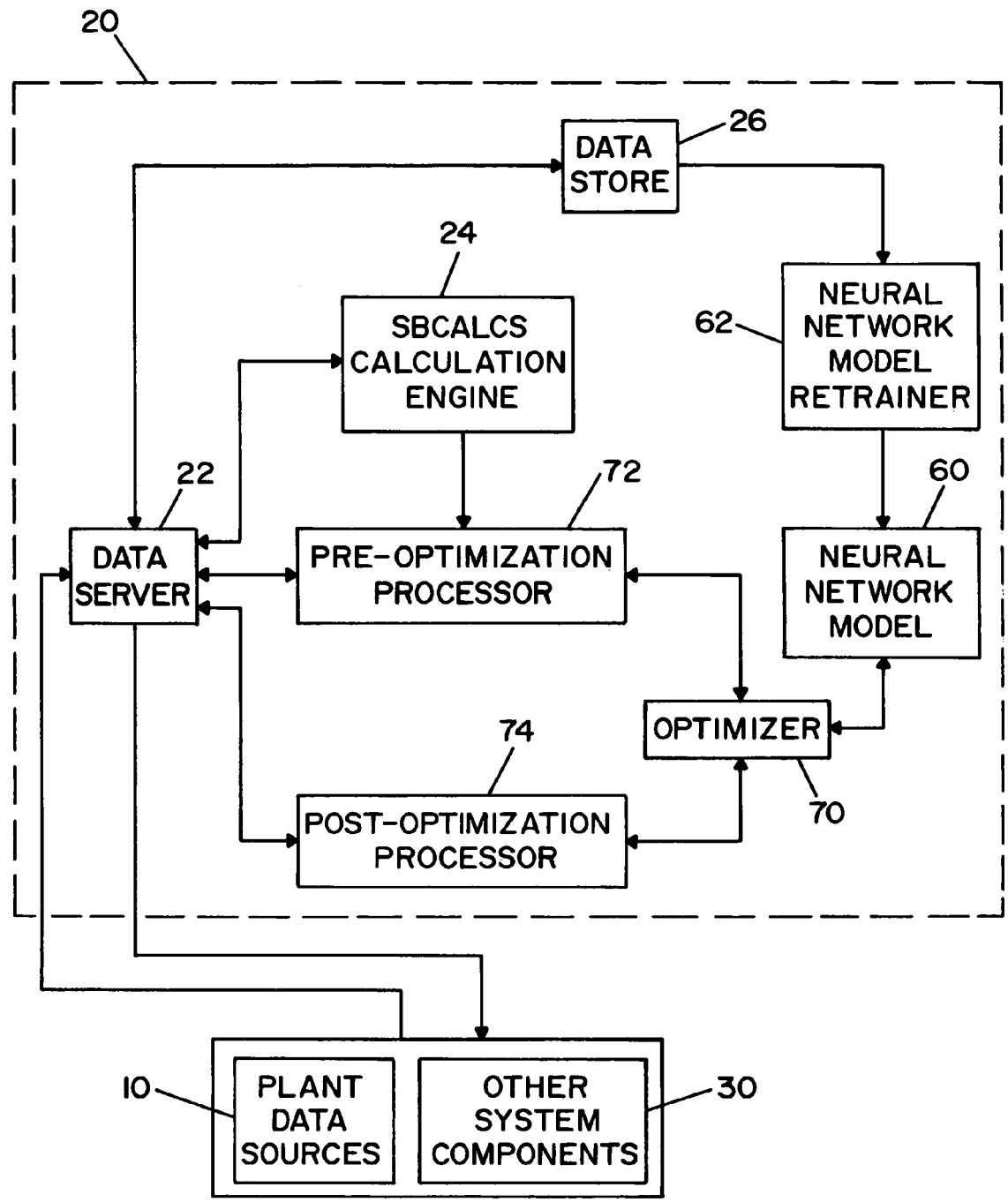
FIG. 1 is a block diagram of a soot cleaning optimization system according to an embodiment of the present invention.

It should be appreciated that while an embodiment of the present invention is described herein with reference to a power generating unit that uses coal, the present invention is applicable to boilers used in connection with power generating systems using other combustible fuels and with systems other than power generating units.

It should also be understood that the various systems described in the illustrated embodiments of the present invention may take the form of computer hardware, computer software, or combinations thereof. The computer hardware may take the form of a conventional computer system including a processor, data storage devices, input devices (e.g., keyboard, mouse, touch screen and the like), and output devices (e.g., display devices such as monitors and printers), or be embodied as part of another computer system.

The main components of a fossil fuel fired power generating unit will now be briefly described. A typical power generating unit includes one or more forced draft (FD) fans that are powered by motors. The forced draft fans supply air to mills and to burners, via an air preheater. Ambient air is heated as it passes through the air preheater. The mills include pulverizers that are powered by motors. The pulverizers grind coal (or other fuel) into small particles (i.e., powder). The air received by the mills from the forced draft fans is used to dry and carry the coal particles to the burners. Air from the forced draft fans that is supplied to the burners, via the air preheater, facilitates combustion of the coal at the furnace. Hot flue gases are drawn out of the furnace by one or more induced draft (ID) fans, and delivered to the atmosphere though a stack or chimney. The induced draft fans are powered by motors. Water is supplied to a drum by control of a feedwater valve. The water in the drum is heated by the furnace to produce steam. This steam is further heated by a superheater. A superheater spray unit can introduce a small amount of water to control the temperature of the superheated steam. A temperature sensor provides a signal indicative of the sensed temperature of the superheated steam. The superheated steam is supplied to a turbine that produces electricity. Steam received by the turbine is reused by circulating the steam through a reheater that reheats the steam. A reheater spray unit can introduce a small amount of water to control the temperature of the reheated steam. A temperature sensor provides a signal indicative of the sensed temperature of the reheated steam.

A "boiler" includes, but is not limited to, the burners, furnace, drum, superheater, superheater spray unit, reheater, reheater spray unit, mills, and a boiler economizer. The boiler economizer recovers the "waste heat" from the boiler's hot stack gas and transfers this heat to the boiler's feedwater.

Soot cleaning devices (including, but not limited to, sootblowers, water lances, and water cannons or hydro-jets), use steam, water or air to dislodge deposits, such as slag, and clean surfaces throughout various locations in the boiler. Soot cleaning is required to maintain performance and efficiency of the power generating unit. The number of soot cleaning devices on a given power generating unit can range from several to over a hundred. Furthermore, the soot cleaning devices may be grouped together by location (e.g., zones in the boiler). Each group of soot cleaning devices may be comprised of one or more soot cleaning devices. For example, a boiler may have eight (8) soot cleaning device groups, each group comprising five (5) individual soot cleaning devices.

It should be understood that a typical power generating unit also includes additional components well known to those skilled in the art including, but not limited to, tubes for carrying fluids and additional sensing devices for sensing a wide variety of system parameters (e.g., temperature, pressure, and flow rate).

Figure 3:
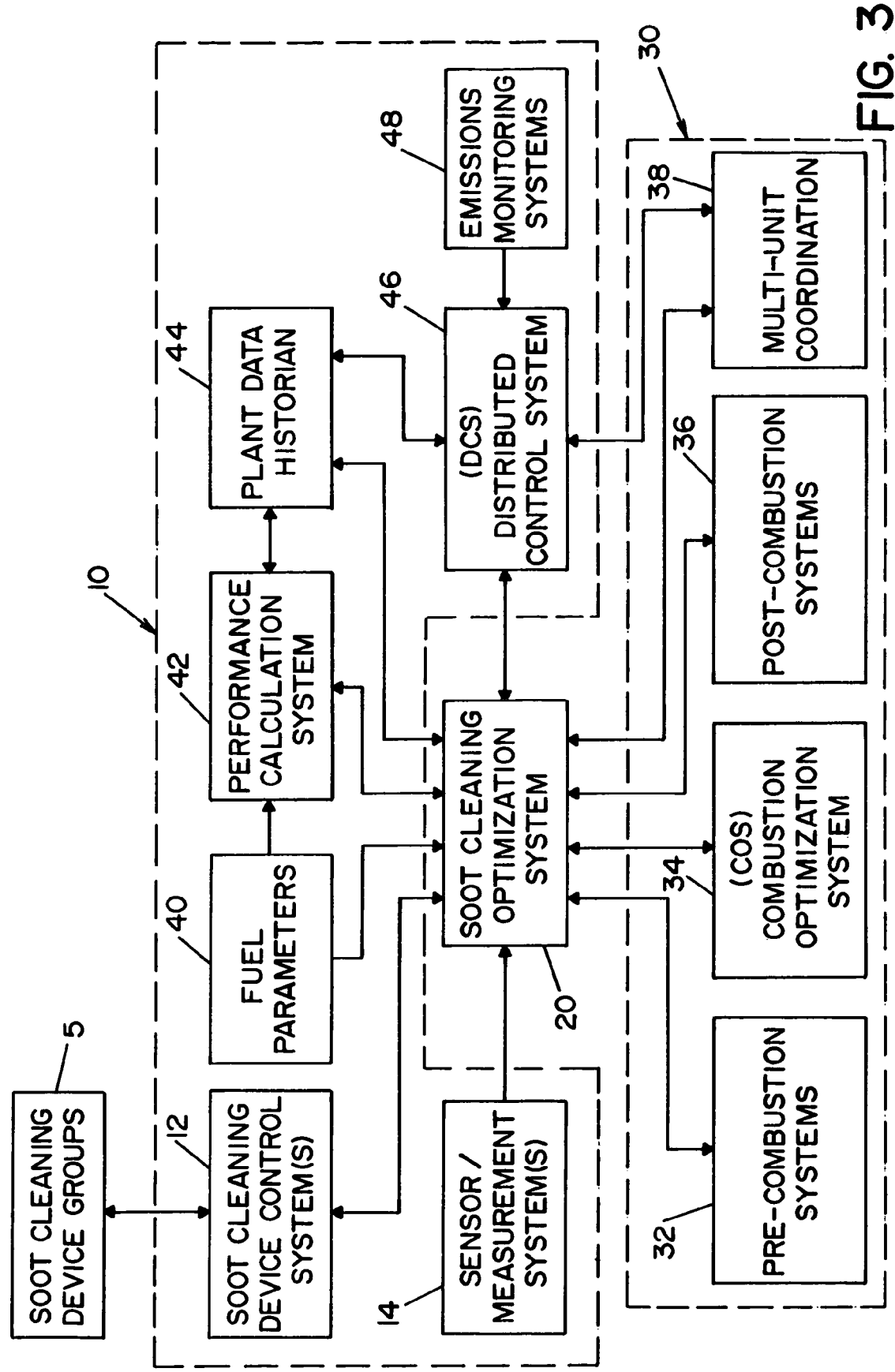
FIG. 3 is a block diagram illustrating data communications between the soot cleaning optimization system of FIG. 1 and other system components of a power generating plant.

Referring now to the drawings wherein the showings are for the purposes of illustrating a preferred embodiment of the invention only and not for the purposes of limiting same, FIG. 1, shows a block diagram of a soot cleaning optimization system 20, according to an embodiment of the present invention, while FIG. 3 shows a block diagram illustrating data communications between components of soot cleaning optimization system 20, plant data sources 10 and other system components 30 of a power generating plant, as will be described below. It should be understood that the data communication configuration shown in FIGS. 1 and 3 illustrate an embodiment of the present invention, and that it is contemplated that many alternative data communication configurations are also suitable for use in connection with the present invention.

According to an illustrated embodiment of the present invention, soot cleaning optimization system 20 includes a data server program module 22, an SBCalcs calculation engine 24, a data store 26, a neural network model 60, a neural network model retrainer 62, an optimizer 70, a pre-optimization processor 72 and a post-optimization processor 74. Each component of soot cleaning optimization system 20 will be described in detail below.

Soot cleaning optimization system 20 preferably uses unidirectional and/or bi-directional data communications link programs to acquire data (measured and calculated) from plant data sources 10 pertaining to various plant parameters (described below).

Data server 22 acts to facilitate bi-directional exchange of data from a variety of sources (e.g., plant data sources 10 and other system components 30), including program modules internal to soot cleaning optimization system 20. Furthermore, data server 22 manages data acquired synchronously or asynchronously from one or more plant data sources 10 and/or other system components 30. Recommended adjustments in the form of biases, setpoints or activation signals may be communicated to the appropriate control systems at varying intervals. Alarm signals and status indicators may be written back to the appropriate control systems or reporting systems at varying intervals. Industry standard data communication protocols (such as TCP/IP, Modbus, Serial, etc.), as well as proprietary protocols or combinations thereof may be employed to facilitate bi-directional data communications with different plant data sources 10 and/or other system components 30.

With reference to FIG. 3, plant data sources 10 include, but are not limited to, soot cleaning device control system(s) 12, sensor/measurement system(s) 14, fuel parameters 40, a performance calculation system 42, a plant data historian 44, a distributed control system (DCS) 46, and emissions monitoring systems 48. By way of example, and not limitation, fuel parameters 40 may include sensors or calculations that provide data indicative of the volume and type of fuel being consumed, or ready to be consumed. This data may include such items as fuel flow, the analysis composition of the fuel, such as carbon content, and other trace elements, especially those that affect slag and fouling attributes. The fuel parameters may be determined by external sensors or calculations, or may be internally determined by soot cleaning optimization system 20. By way of example, and not limitation, plant data historian 44 may include any short term or long term historical data base or retention system, and may include manual entry and recording of data. One commercial example of a plant data historian is the PI system produced by OSI.

Sensor/measurement system(s) 14 sense or measure various plant parameters, described below. Commercially available sensing devices include, but are not limited to, fuel measurement and elemental analyzers, SmartGauge sensors (strain gauge or weight sensing technology), heat flux sensors, temperature measurement systems (based on thermocouples, acoustics, lasers, optics, etc.), resistivity measurement systems, downstream systems such as continuous emissions monitoring systems, voltage, current, flow, pressure, temperature, optical, microwave instruments, etc.

Performance calculation system 42 is a computer or manually collected data system that determines full or partial plant heat rate calculations, efficiencies, or controllable loss components for steam generation. These controllable loss components can be summed to produce an "efficiency reference index" (ERI). A performance calculation system 42 is described in further detail in U.S. patent application Ser. No. 10/985,705, filed Nov. 10, 2004, entitled "System for Optimizing a Combustion Heating Process. This patent application is fully incorporated herein by reference.

Distributed Control System (DCS) 46 is a computer system that provides control of the combustion process by operation of system devices, including, but not limited to, valve actuators for controlling water and steam flows, damper actuators for controlling air flows, and belt-speed control for controlling flow of coal to mills. Sensors (including, but not limited to, oxygen analyzers, thermocouples, resistance thermal detectors, pressure sensors, and differential pressure sensors) sense parameters associated with the boiler and provide input signals to DCS 46. DCS 46 may also provides parameters to performance calculation system 42.

Emissions monitoring systems 48 provides data associated with emissions or byproduct information from the power plant.

Soot cleaning optimization system 20 may acquire data from plant data sources 10 using a data acquisition program that may be a separate program module or part of data server program module 22. In particular, soot cleaning device control system(s) 12 provides soot cleaning optimization system 20 with data pertaining to a set of parameters (e.g. flow, current, duration, mode, state, status, time, etc.) for one or more soot cleaning device groups 5. Each soot cleaning device group 5 is comprised of one or more soot cleaning devices. Accordingly, each soot cleaning device group 5 may consist of a single soot cleaning device or a plurality soot cleaning devices. Soot cleaning device control system(s) 12 may include, but are not limited to, sootblower control systems, hydrojet control systems, water cannon control systems, etc. It should be appreciated that activation of one group of soot cleaning devices can effect multiple areas of the boiler, including areas of the boiler served by other soot cleaning device groups.

Soot cleaning optimization system 20 may self-calculate or acquire information and data from any of the aforementioned systems that pertains to predicted and non-predicted natural cleaning events. Natural cleaning events are events wherein a soot cleaning device, such as a sootblower, may not be the direct cause of cleaning of the power generating unit. An example of a natural cleaning event is a physical or thermal shock, or a load change.

Soot cleaning optimization system 20 may be employed to work in combination with soot cleaning device control system(s) 12 and intelligently influence their operation. Soot cleaning device control system(s) 12 may be configured to receive activation signals (ON/OFF), alarms or reports (driven on the basis of SBCalcs parameters and plant parameters, described below) from soot cleaning optimization system 20 for one or more soot cleaning devices. In such cases, the actual action of activating soot cleaning devices is still performed by the relevant soot cleaning device control system(s) 12, but the determination of which soot cleaning device(s) to activate, and when to active a soot cleaning device is determined by soot cleaning optimization system 20.

It should be understood that soot cleaning device control system(s) 12 may communicate directly with soot cleaning optimization system 20. Alternatively, the soot cleaning device control capability may exist as part of DCS 46. Similarly, functionality of one or more of the other plant data sources 10, such as sensor/measurement systems 14, performance calculation systems 42, plant data historians 44 and emissions monitoring systems 48, may exist separately or may be combined as part of one of the other plant data sources 10 or other system components 30. It will be appreciated that actual configuration will be specific to the power plant.

In accordance with the present invention, data from plant data sources 10 and other system components 30, SBCalcs parameters (described below), plant parameters (described below) or combinations thereof are used to (a) determine which soot cleaning devices to activate and when to activate the soot cleaning devices, (b) derive optimal biases/setpoints for various plant parameters using artificial intelligence techniques of the present invention, and (c) support alarming and reporting features.

Soot Cleaning Calculations

SBCalcs Calculation Engine 24 examines data acquired from one or more plant data sources 10 and generates calculated parameters referred to herein as "SBCalcs parameters." SBCalcs parameters are derived for one or more soot cleaning device groups 5. As indicated above, each soot cleaning device group 5 is comprised of one or more soot cleaning devices. The SBCalcs parameters are used for analysis, neural network modeling, pre-optimization processing, optimization, post-optimization processing, and eventually to determine when and which soot cleaning device(s) to select for activation, as will be described in detail below.

The SBCalcs parameters establish a basis for generating information on the interrelationships between soot cleaning device groups, and/or on the relationship between soot cleaning device groups and the physical conditions of the boiler, including, but not limited to, heat absorption, energy usage, gas flow, obstruction development or cleaning, and interaction with upstream or downstream devices and processes that interact with the boiler, air preheater sections, or all locations serviced by soot cleaning devices.

SBCalcs parameters provide a foundation for exploring relationships between soot cleaning device groups and the location of the soot cleaning device groups within the furnace and with physical relationship to one another. The SBCalcs parameters provide information on the dependency and interrelationship of soot cleaning device groups.

SBCalcs parameters are time value parameters that may be determined by use of timers, user-defined values (e.g., thresholds) and calculated values. It should be appreciated that SBCalcs parameters may be used as inputs to calculations, or constraints for calculations or other dynamically changing or predicted plant parameters. SBCalcs parameters may include, but are not limited to, the following time value parameters:

DutyCycle parameter is calculated for each soot cleaning device group that may be controlled using soot cleaning optimization system 20. DutyCycle represents the total duration of time for which soot cleaning devices in a soot cleaning device group were active within a defined time period (e.g., 24 hours).

OffTime parameter is calculated for each soot cleaning device group that may be controlled using soot cleaning optimization system 20. OffTime represents the time for which soot cleaning devices in a soot cleaning device group were inactive. It should be appreciated that this parameter may account for soot cleaning devices that are out-of-service. The Offtime parameter is an historical value indicative of what has transpired.

OnTime parameter is calculated for each soot cleaning device that may be controlled using soot cleaning optimization system 20. OnTime represents the total duration of time for which soot cleaning devices in a soot cleaning device group were active. The Ontime parameter is an historical value indicative of what has transpired.

MaxOffTime parameter is determined for each soot cleaning device group that may be controlled using soot cleaning optimization system 20. MaxOffTime represents the maximum total duration of time for which soot cleaning devices in a group may be left inactive subsequent to a soot cleaning operation.

MinOffTime parameter is determined for each soot cleaning device group that may be controlled using soot cleaning optimization system 20. MinOffTime represents the minimum total duration of time for which soot cleaning devices in a soot cleaning device group should be kept inactive subsequent to a soot cleaning operation.

Soot cleaning optimization system 20 of the present invention utilizes the above described SBCalcs parameters that are based on actual operating data acquired from soot cleaning device control system(s) 12. The SBCalcs parameters are independent of thermo-dynamic models, boiler design considerations, fuel fluctuations, rules, simplifying assumptions, etc. The SBCalcs parameters of the present invention are used in conjunction with various techniques described herein to optimally determine when and which soot cleaning devices to select and signal for activation along with other applicable plant parameters, as will be described below.

Neural Network Model

A neural network model 60 (or alternatively, another type of system model) is developed using parameter values including, but not limited to, the SBCalcs parameters described above and various plant parameters, described in detail below. Neural network model 60 is used in connection with an optimizer 70.

Plant parameters may include, but are not limited to: combustion parameters, fuel parameters, post-combustion parameters, emissions parameters, performance parameters, given conditions, and state indicators. Combustion parameters include, but are not limited to, temperatures, pressures, flows, speeds, weights, volumes, voltages, currents, wattages, resistances, positions, velocities, mass, sizes, vibration measurements, flue gas constituents, grind measurement, viscosity, and the like related to pre-combustion, combustion and post-combustion stages in a power plant. Fuel parameters include, but are not limited to, fuel composition parameters, various flue gases derived from the combustion of fuel, fuel processing inputs such as vibrations, fuel handling flow rates, grind, viscosity, particle size variables, and the like. Emissions parameters include, but are not limited to, levels of nitrous oxides (NOx), carbon dioxide ($CO_2$), carbon monoxide (CO), sulfur oxides (SOx), mercury (Hg), particulate matter (PM), ammonia ($NH_3$), and the like. Post-combustion parameters include, but are not limited to, parameters related to post-combustion systems such as Selective Catalytic Reduction (SCR) system, Flue Gas Desulfurization system, Electrostatic Precipitator system Carbon-in-ash analysis/measurement/improvement system, mercury analysis/measurement/reduction system, and the like. Performance parameters include, but are not limited to, efficiency, energy loss calculations, heat rate, enthalpy, heat transfer, tube/metal life, thermal stress, metal fatigue, and the like. Given conditions include, but are not limited to, ambient atmospheric conditions (temperature, pressure, humidity, and the like), prevailing equipment conditions, and the like. State indicators include, but are not limited to, 0/1, on/off, open/close, manual/auto, local/remote, in-calibration, out-of-service, in-hold, not-in-hold, power plant device states (e.g., soot cleaning device states), and the like.

Soot cleaning optimization system 20 may communicate with various systems in a power plant and exchange data pertaining to plant parameters. In this regard, relevant plant parameters are acquired from plant data sources 10 to develop neural network model 60. In the exemplary embodiment illustrated in FIG. 3, soot cleaning optimization system 20 may communicate with plant data sources 10, as well as other system components 30 including, but not limited to, pre-combustion systems 32, a combustion optimization system (COS) 34, post-combustion systems 36, a multi-unit coordination system 38. Pre-combustion systems may include any system acting prior to the combustion of fuel, such as, but not limited to, automatic or manually derived fuel management systems, fuel elemental scanning devices, or fuel handling systems. Post-combustion system 36 may be represented by such systems that do subsequent processing of flue gas, such as Flue Gas De-sulfurization (FGD) systems. A multi-unit coordination system 38 may include process variables associated with more than one power generating unit in a power generating plant, such as a combustion variable associated with two separate boilers.

COS 34 is a computer system that optimizes the combustion process by optimizing air flows, fuel flows, distributions, pressures, air/fuel temperatures and heat absorption, to achieve optimal combustion conditions. Output data of COS 34 (i.e., the control value recommendations) may be received by Distributed Control System (DCS) 46 to provide real-time optimal control of the combustion process. Accordingly, fuel blending systems, scrubbers, SCR systems, sootblowing, and the like, can also be optimized.

Figure 2:
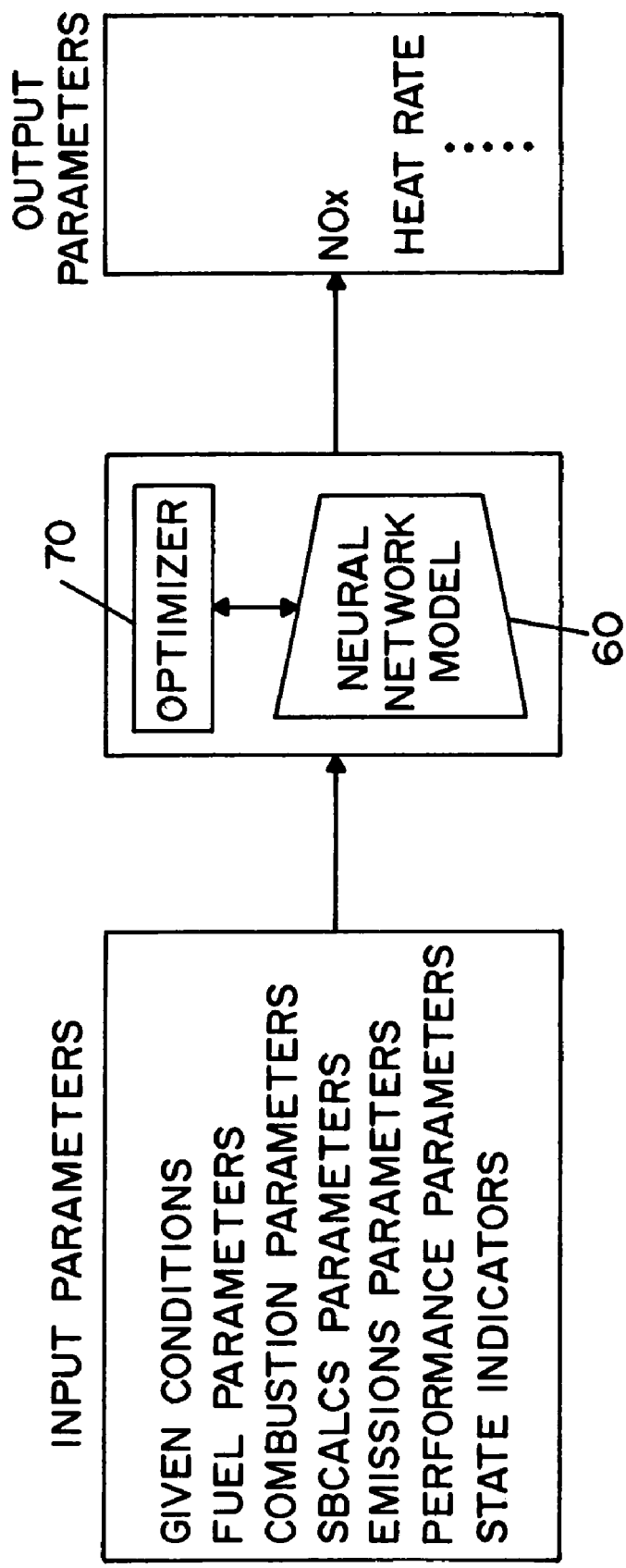
FIG. 2 is a block diagram illustrating operation of a neural network model and an optimizer of the soot cleaning optimization system shown in FIG. 1.

As shown in FIG. 2, neural network model 60 receives input parameters and generates output parameters. The input parameters may include, but are not limited to, parameter values associated with SBCalcs parameters and plant parameters. Each input parameter may be categorized as being (1) a controllable variable (also referred to as a 'manipulatable' variable) or (2) an input or given variable (also referred to as a 'disturbance' variable). Controllable (or manipulatable) variables are variables that can be controlled by the power plant operator, while given (or disturbance) variables are inputs that cannot be controlled by the power plant operator, and in some cases, cannot be measured. Examples of given variables are temperature, humidity, fuel composition, etc.

The output parameters of neural network model 60 may include, but is not limited to, one or more goals (also referred to as 'controlled variables'). Output parameters may be a function of one or more input parameters. In the embodiment illustrated in FIG. 2, the output parameters include NOx and heat rate.

As an example, one such neural network model 60 for representing combustion and soot cleaning relationships was developed using the list of input parameters and output parameters identified below in Tables 1 and 2.

It should be appreciated that the neural network input and output parameters described below are only an example set of model input and output parameters for illustrating the present invention, and that an actual set of model input and output parameters will be site specific. Furthermore, classification of a input parameter as Given/Disturbance or Controllable/Manipulatable is also site specific.

TABLE 1

Neural Network Input parameters

| Input parameter Description | Input Variable Type |
|---|---|
| Power generated by the power generating unit | Given/Disturbance variable |
| Coal feed through the pulverizers (one signal for each pulverizer) | Controllable/Manipulatable variable |
| Pulverizer outlet temperatures (one signal for each pulverizer) | Controllable/Manipulatable variable |
| Air damper positions | Given/Disturbance variable |
| Primary air flow relative to each pulverizer | Given/Disturbance variable |
| Tempering air flow | Given/Disturbance variable |
| Secondary air flow | Given/Disturbance variable |
| Total air flow | Given/Disturbance variable |
| Excess oxygen | Controllable/Manipulatable variable |
| Carbon Monoxide | Given/Disturbance variable |
| Stack Opacity | Given/Disturbance variable |
| Sulfur Dioxide | Given/Disturbance variable |
| Ambient temperature | Given/Disturbance variable |
| Calculated soot cleaning device group duty cycle parameters (one for each group of soot cleaning devices) | Controllable/Manipulatable variable |
| Inlet temperature to reheat section | Given/Disturbance variable |
| Outlet temperature from reheat section | Given/Disturbance variable |
| Inlet temperature to superheat section | Given/Disturbance variable |
| Outlet temperature from superheat section | Given/Disturbance variable |
| Inlet temperature to economizer section | Given/Disturbance variable |
| Outlet temperature from economizer section | Given/Disturbance variable |
| Outlet temperature from air preheater section | Given/Disturbance variable |
| Furnace exit gas temperature | Given/Disturbance variable |
| Main steam temperature | Given/Disturbance variable |
| Reheat steam temperature | Given/Disturbance variable |
| Furnace pressure | Given/Disturbance variable |
| Windbox pressure | Given/Disturbance variable |
| Forced draft fan vane position | Controllable/Manipulatable variable |
| Forced draft fan amperes | Given/Disturbance variable |
| Reheat spray flow | Given/Disturbance variable |
| Reheat differential pressure | Given/Disturbance variable |
| Superheat spray flow | Given/Disturbance variable |
| Superheat differential pressure | Given/Disturbance variable |

TABLE 2

Neural Network Model Output Parameters

| Output Parameter Description | Variable Type |
|---|---|
| NOx emission | Goal/Output |
| Boiler efficiency (alternatively, calculated net unit heat rate may be used) | Goal/Output |

Neural network model 60 is trained using normal power plant operation, parametric testing and/or historical data. A training process involves adjustments of the nodal connection strengths (i.e., neural network weights) based on iterative examination of input parameters. In this regard, neural network model 60 is trained to predict output parameters based upon input parameters. Neural network model 60 thus developed is then utilized in conjunction with an optimizer 70 to determine appropriate adjustments to input parameters for achieving the desired goals, within defined constraints, as will be described in detail below.

It should be appreciated that neural network model 60 allows complex relationships between soot cleaning, air, fuels, emissions, temperatures, pressures, opacity, heat rate and the like can be effectively modeled. The models are developed using historical data, parametric testing data, normal plant operating data, outputs from other neural networks, or combinations thereof.

In an embodiment of the present invention, some SBCalcs parameters and plant parameters may be defined as 'controllable' variables for optimization purposes, so that the objective of optimizer 70 is to achieve optimization 'goals' (e.g., NOx emissions and heat rate) by adjusting the controllable SBCalcs parameters and relevant plant parameters (if included) under given constraints (e.g., keeping reheat and superheat spray flows in a control range; maintaining the system to allow burner tilts to be effective in a combustion optimization system (COS); maintaining a temperature window for a precipitator; etc). Optimization constraints for the SBCalcs parameters and relevant plant parameters, as well as the 'objective function' (relationship) for neural network model output parameters, such as NOx emissions and heat rate, may be configured by the user or adjusted in real-time on the basis of plant and equipment design conditions, other systems data, other neural networks, thermal principles, engineering knowledge, operational experience, established policies, safety considerations, and/or dynamically acquired plant operation information (data values) from the plant data sources 10.

Pre-optimization processor 72 performs pre-processing operations that can examine and dynamically alter the configuration of optimizer 70. Accordingly, various operational constraints, real-time events and trigger conditions are considered. For instance, pre-optimization processor 72 may determine which input parameters to neural network model 60 cannot be changed and designate input parameters that are controllable. For input parameters that can be changed (i.e., controllable input parameters), pre-optimization processor 72 can identify any limits to the changes. The actual list of operational constraints, real-time events and trigger conditions is site and application specific. However, the following list may serve as an example, including, but not limited to:

1. Make adjustments so as to maintain steam temperatures per user-defined threshold values.
2. Make adjustments so as to keep reheat and/or superheat spray flows within or outside of user defined threshold values.
3. Make adjustments so as to keep burner tilts within or outside of user-defined threshold values.
4. Make adjustments so as to maintain parameters such as stack opacity, carbon monoxide, carbon-in-ash, etc. per user-defined threshold values.
5. Suspend soot cleaning activity when the unit load falls below, goes above, is in range or is out of range per user-defined threshold values.
6. If time is less than MinOffTime for soot cleaning device (s), do not attempt to adjust the relevant soot cleaning device(s).
7. If time is greater than MaxOffTime for soot cleaning device(s), make adjustments so as to signal activation of the relevant soot cleaning device(s).
8. If the unit has recently undergone, is undergoing or is expected to undergo a natural cleaning event the soot cleaning activities may be put on hold temporarily and/ or evaluated further considering other plant parameters.
9. Check for adjustments per user-defined time-based relationships.

10. May make adjustments based on user defined threshold values for plant parameters SBCalcs parameters, other operational constraints, real-time events, trigger conditions or combinations thereof.
11. Activate selected soot cleaning device(s) in a user defined pattern, such as top-down, bottom-up, side-to-side, diagonally, individually, in pairs, in groups or combinations thereof.
12. Only user defined number of soot cleaning device(s) may be signaled for activation at a time. This could be due to available steam header pressure limitations or other operational constraints.
13. Make adjustments to SBCalcs and plant parameters so as to maintain temperature range of flue gas entering post combustion systems, such as selective catalytic reduction (SCR) system, electrostatic precipitator system, flue gas desulfurization system, and the like.

Optimizer 70 queries neural network model 60 with various 'controllable' input parameters to obtain predicted output parameters. In this regard, optimizer 70 iteratively varies one or more 'controllable' input parameters to neural network model 60 until the predicted output parameters are substantially equal to desired output parameters. More specifically, optimizer 70 triggers automatically on the basis of time and/or plant operational events. It queries neural network model 60 in an iterative fashion to perform "what-if" scenarios. Results of each iteration of the "what-if" operation are evaluated for further analysis and processing. Each run of optimizer 70 ends upon an exhaustive search and evaluation of many possible variations for different controllable variables (e.g., plant parameters and/or SBCalcs parameters) and their corresponding predicted effects on 'goals' (e.g., NOx and heat rate). Optimization results are generated in the form of recommended adjusted controllable input parameters determined necessary by optimizer 70 to achieve optimization 'goals' while considering operational, safety and system constraints.

It should be appreciated that in accordance with the present invention, the "objective function" for optimizer 'goals' can also be adjusted in real-time. Thus, the capability to dynamically adjust various optimizer parameters prior to or during each execution of optimizer 70 run permits soot cleaning optimization system 20 to always search for a better operating condition than the one obtained previously, while considering the current operating constraints and objectives.

The objective function is the mathematical relationship between all of the inputs and the goals of the neural network. The objective function includes the goals and their relative weighting (i.e., importance) vis-à-vis total desired outcome of all the optimizer goals combined, as well as the weighting of all of the inputs relative to one another in the neural network. The optimizer solves for the total best desired outcome, while the neural network relates all inputs to each separate output.

Post-Optimization

Post-optimization processor 74 performs post-processing operations. One operation performed by post-optimization processor 74 is the validation and further evaluation of the results obtained by optimizer 70. In this regard, post-optimization processor 74 examines the results of each optimization run and evaluates the operating conditions of the power generating unit to derive the control adjustments necessary. For example, at a given power plant, not all available soot cleaning devices may be simultaneously operable because of steam header pressure limitations and power plant operational issues. Various plant parameters may also be evaluated prior to sending adjustment signals (in the form of biases, setpoints or activation signals) to the relevant plant control systems. Post-optimization processor 74 also facilitates conversion of optimization results to control signals/adjustments necessary to achieve the desired optimization goals. Post-optimization processor 74 may output parameter values in the form of: (a) biases or setpoints for various controllable plant parameters, (b) activation indicators (turn ON or keep OFF) for one or more soot cleaning devices, (c) information signals, and (d) alarm signals. Such parameter values are written to data server 22 for access by other system components, and communicated to the relevant control systems (i.e., distributed control systems (DCS) 46, soot cleaning device control systems 12, etc.) for pertinent control actions and reporting. Soot cleaning optimization system 20 then gathers new data and the entire processing cycle repeats itself, as indicated in FIG. 4B.

Ranking Soot Cleaning Devices

As indicated above, one of the operations performed by post-optimization processor 74 is to evaluate the results of optimizer 70. One such evaluation involves a ranking process that will now be described in detail. Optimization results are further processed to by post-optimization processor 74 to facilitate identification of soot cleaning devices that should be turned-on or kept off. In this respect, for each soot cleaning device group 5, a Target_Factor is calculated for at least one associated SBCalcs parameter (e.g., DutyCycle). For example, Target_Factor may take the form of the formula shown:

Target_Factor=(OptResult−CurrentValue)/OptCycleTime where OptResult is the optimization result for a soot cleaning device group DutyCycle (i.e., the adjusted DutyCycle value resulting in the optimized output parameters, as determined by optimizer 70), CurrentValue is the current value of DutyCycle for the soot cleaning device group, and OptCycleTime may be the optimization cycle time (i.e., the chosen period for running optimizer 70, for example, every 15 minutes).

The calculated Target_Factor is then compared against predefined threshold ranges. The number of threshold ranges and their values are site and/or application specific. As an example, a site may use the threshold range designations described below in Table 3:

TABLE 3

Target_Factor and Target_Factor_Weight threshold range designation examples

| Description | Defined Threshold Range | Weight |
|---|---|---|
| Do not activate relevant soot cleaning devices in the soot cleaning device group | Target_Factor greater than 0.0 and less than 0.65 | 0 |
| May not activate relevant soot cleaning devices in the soot cleaning device group | Target_Factor equal to or greater than 0.65 and less than 0.8 | 1 |
| May activate relevant soot cleaning devices in the soot cleaning device group | Target_Factor equal to or greater than 0.8 and less than 1.0 | 2 |
| Activate relevant soot cleaning devices in the soot cleaning device group | Target_Factor equal to or greater than 1.0 | 3 |

As shown in Table 3 above, based on the comparison against Threshold Ranges each calculated Target_Factor is assigned a weight value referred to as Target_Factor_Weight. Soot cleaning optimization system 20 ranks each soot cleaning device group based on their associated Target_Factor and Target_Factor Weight values. Accordingly, the greater the value of Target_Factor for a soot cleaning device group, the higher its rank. The Target_Factor Weight value facilitates determining whether the relevant soot cleaning device group with the highest rank should be activated or not. For example, the soot cleaning device group having the largest associated Target_Factor value (that indicates May Activate or Activate) and meeting all operational limitations may be selected for activation. Once at least one soot cleaning device group is identified for activation, the relevant signals (i.e., signals to turn-on at least one soot cleaning device) may be transmitted to the respective soot cleaning device control system 12. It should be understood that it is possible that none of the soot cleaning device groups are activated because none of the associated Target_Factor values rise above the level associated with Do Not Activate or May Not Activate.

It should be appreciated that in addition to Target_Factor and Target_Factor Weight values other operational conditions of the power generating unit and power plant may be evaluated to decide which soot cleaning device group to activate.

Path Forecasting

The above-described ranked selection of soot cleaning device groups for activation may optionally be further processed by use of a path forecasting analysis that will now be described with reference to FIGS. 5 and 6. Soot cleaning optimization system 20 may also rank soot cleaning device groups according to their importance while also considering past, present and anticipated plant operating conditions. In this regard, soot cleaning optimization system 20 may include a path forecasting system 200 that provides look-ahead capability when determining which soot cleaning device group(s) to activate. Path forecasting system 200 facilitates optimal selection of one or more soot cleaning device groups for activation, taking into account current and past operation, safety and operational constraints, operational events and predicted power generating unit operation (as it relates to one or more of the soot cleaning optimization goals) in the future. Path forecasting system 200 may include the use of a neural network (or alternatively, another modeling technique), an optimizer, a decision tree rule-based system, ranking techniques, fuzzy logic, vector machines, and other artificial intelligence techniques.

In many decision making events the consequence of the first action taken will affect future actions and possibilities. These consequences include: (1) possible future actions can be limited by selection of the first action, or possible future actions may be increased by the first selection, (2) net beneficial effects may be decreased by selection of the first action, or net beneficial effects may be increased by selection of the first action, and (3) safety considerations may be limited, even violated by the impact of the first action, while on the other hand proper first actions may be a requirement for safe operation. In controlling a process the implication of one control act may have impact on the next opportunity for optimal result over time. Importantly, a present time (i.e., time zero $t_0$) decision can impact future time events, benefits, optimal results, and the potential of future rules violations.

Path forecasting system 200 applies the techniques of a neural network model, optimizer and decision tree rule-based system for their respective area of strength, and uses a combination of all techniques in a hybrid artificial intelligence solution. In this case, a neural network in combination with an optimizer is used for their prediction capabilities. A decision tree is used to store and explore various predictions made by the neural network at several steps in time. This tree structure is developed using a set of expert rules guiding the constriction of the tree, based on domain specific knowledge, the rules established as constraints in pre- or post-processing, new data, historical assumptions, other neural networks, or combinations thereof. Finally, a search algorithm is used to explore the decision tree and select the best path to the goal. In this way, each technique is used only for its strength, while another technique makes up for its weakness the overall effect being a synergy in which decisions are made more accurately and intelligently than any of the individual techniques could make in isolation.

Figure 5:
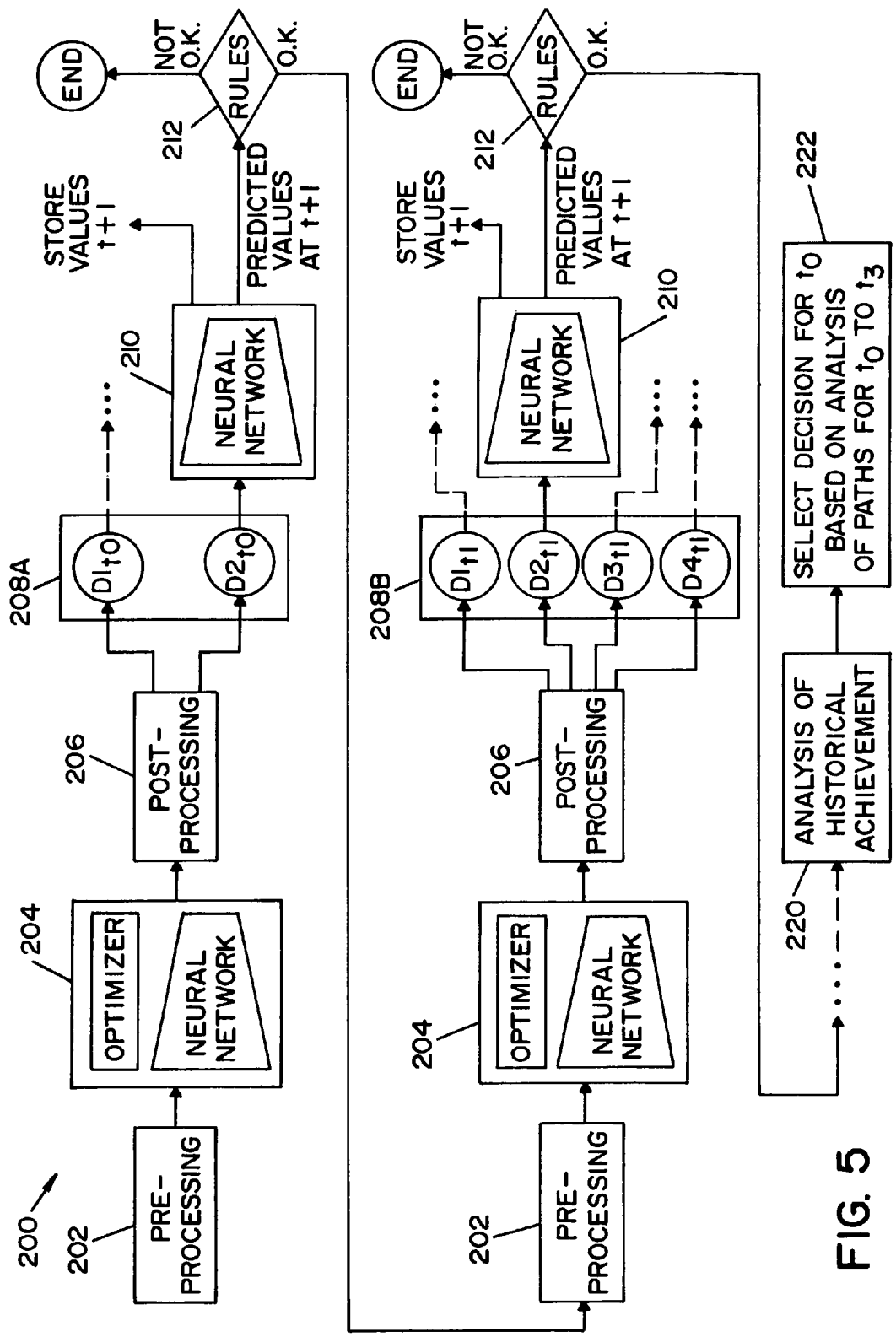
FIG. 5 is a flow diagram illustrating operation of a path forecasting system, according to an embodiment of the present invention.
Figure 6:
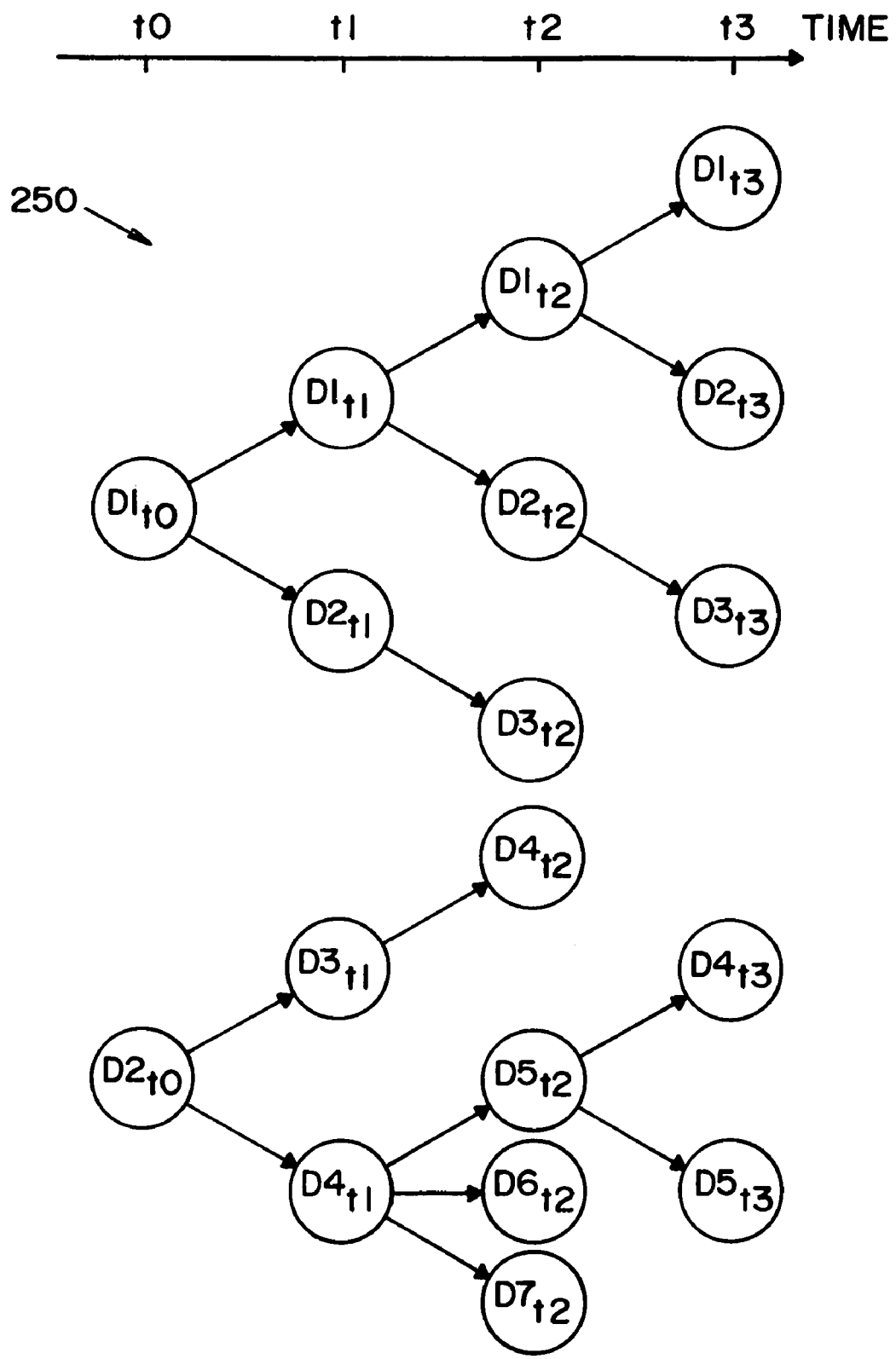
FIG. 6 illustrates an exemplary decision tree developed by the operation of the path forecasting system.

Referring now to FIG. 5, there is shown a flow diagram illustrating operation of path forecasting system 200, according to an embodiment of the present invention. It should be understood that the path forecasting system 200 includes several iterative steps for developing a decision tree (FIG. 6). In this regard, one or more decisions D are determined that represent a decision to activate a soot cleaning device group. Each decision D is investigated at least one step into the future through an iterative process using a neural network to model changes in the problem state, and an optimizer to select further decisions. Expert logic is used to constrain the decision steps. At the end of processing, a set of final decisions are provided for multiple steps (e.g., 3-5 steps) into the future.

Operation of path forecasting system 200 will now be described in further detail. Pre-processing step 202 is substantially the same as the pre-processing operation of pre-optimization processor 72 described above, optimization step 204 is substantially the same as the optimization operation described above in connection with FIG. 2, and post-processing step 206 is substantially the same as the post-processing operation of post-optimization processor 74 described above.

Post-processing step 206 includes the step of ranking each soot blowing device group. The ranked outputs are shown at step 208A as decision $D1_{t0}$ and decision $D2_{t0}$. $D1_{t0}$ represents a first decision to activate a first soot cleaning device group at time t0, while $D2_{t0}$ represents a second decision to activate a second soot cleaning device group at time t0.

For each possible decision D at time $t_0$, a neural network is used to predict parameter values at time t+1 (step 210). The predicted parameter values may include, but are not limited to, the goals and plant parameters discussed above, calculated values for use in other systems, neural network predictions for other external uses (such as for maintenance prediction), or combinations thereof. It should be appreciated that ranking information may be included in the input parameters fed to the neural network at step 210. The output parameters of the neural network at step 210 are stored for later use, and are also input to a rule base at step 212 to determine whether any rules (e.g., relating to physical or other constraints) are violated by the predicted parameter values. In other words, "boundaries" can be checked at step 212. If it is determined that rules are violated, then the associated decision D at time t0 is considered to follow a terminated path. It should be understood that the rules applied at step 212 may change with each iteration.

If it is determined at step 212 that no rules are violated, then the stored values associated with that decision D are used in the subsequent iteration of processing steps 202, 204 and 206, in the same manner as described above.

Ranked outputs are shown at step 208B as decision $D1_{t1}$, $D2_{t1}$, $D3_{t1}$, and $D4_{t1}$. $D1_{t1}$ represents a first decision to activate a first soot cleaning device group at time t1, $D2_{t1}$ represents a second decision to activate a second soot cleaning device group at time t1, $D3_{t1}$ represents a third decision to activate a third soot cleaning device group at time t1, and $D4_{t1}$ represents a fourth decision to activate a fourth soot cleaning device group at time t1.

Once again, for each possible decision D at time t1, the neural network at step 210 is used to predict parameter values at time t+1. The output parameter values are stored for later use, and are also input to a rule base at step 212 to determine whether any rules are violated by the predicted parameter values. If it is determined that rules are violated, then the associated decision D at time t1 is considered to follow a terminated path. If it is determined that no rules are violated, then the stored values associated with that decision D are used in a subsequent iteration of processing steps 202, 204 and 206, in the same manner as described above.

This foregoing process may continue for each decision D for one or more iterations. FIG. 6 illustrates an exemplary decision tree 250 developed as a result of the foregoing iterative process. As illustrated in FIG. 6, four (4) iterations are developed for decision tree 250. It should be understood that decision tree 250 as shown in FIG. 6 is exemplary, and is provided to illustrate operation of path forecasting system 200 of the present invention.

After a complete decision tree has been developed for the desired number of iterations, historical achievement by each decision D is analyzed (step 220). In this regard, the results obtained by following each possible path is analyzed. The analysis is preferably performed by use of a decision tree search algorithm. For example, the sum of the goals achieved at each step in the path could be summed to find a winning path. At step 222, a decision for time t0 (i.e., the current decision regarding selection of a soot cleaning device group for activation) is made based upon this analysis. Accordingly, the output of path forecasting system 200 is the current decision to be taken.

Path forecasting system 200 allows a future output, or an input, to be predicted based upon a choice made at time zero. Before a decision is made by path forecasting system 200, a path of related decisions are explored, and the net effect of the decision path over multiple paths can be projected, scored, and result in influencing the time zero decision.

It should be appreciated that the present invention also allows substitution of any neural network model in the path with another element, such as simple logic, a rule, a different neural network, a constant or other substitute. This allows great flexibility, while also allowing certain paths to be eliminated from needing to be evaluated, and thus reducing complex calculation time. Actions such as this can eliminate calculating all factorial combinations of possibilities which, in turn, helps with computer loading. Multiple goals (model output parameters) can be evaluated in the path. This simplest manner of doing this is the summation or other mathematical combination of these goals.

In the illustrated embodiment of the present invention, path forecasting is applied in optimizing soot cleaning operations by determining one or more decisions D for at least one time increment, wherein at least one of the decisions D is associated with a discrete variable for operation of at least one soot cleaning device. A discrete variable refers to a variable that has a finite or countable set of values (i.e., not continuous). In the illustrated embodiment, the discrete variable has a value of ON or OFF with regard to activation of a soot cleaning device group.

It should be understood that while the path forecasting aspect of the present invention has been described above with reference to optimization for soot cleaning operations in a power generating plant, it is contemplated that path forecasting may also be used for optimizing the operation of other power plant devices including, but not limited to, SCRs, boiler, FGDs, fuel sources, Electro-Static Precipitators (ESPs), turbine and balance of plant. In addition, the present invention can be used for determining a decision associated with both continuous and discrete variables. For example, a continuous variable is a variable that can take on the full range of values between a minimum and maximum value. As indicated above, a discrete variable can only take on a finite set of values. For example, a path forecasting system may be used to determine the air/fuel mixture in a boiler, the operational state of sootblowers, and the operational states of the pumps of an FGD over a certain time horizon. The parameters associated with the air/fuel mixture are continuous variables, while the operational states of the sootblower and FGD are discrete variables. The goal in this example may be to reduce emissions ($NO_x$ and $SO_2$), and improve heat rate. Another example would be to determine mill, burner and fuel sources as a load profile changes over time in order to improve heat rate in the power generating plant. In this regard, path forecasting may also be used in connection with other power plant devices and other discrete variables.

Neural Network Retraining

Neural network model retrainer 62 periodically retrains neural network model 60. This on-line retraining capability permits neural network models to adapt to changing power plant operation, equipment and fuel conditions. A retraining process can be initiated on the basis of event/trigger conditions or elapsed time. Soot cleaning optimization system 20 sorts new data records by examining values of SBCalcs parameters and plant parameters, and comparing them to user-configurable data sort definitions.

User-configurable data sort definitions are identified on a site and/or application specific basis. User-configurable data sort definitions are configured utilizing state definitions and cluster definitions. State definitions are comprised of any mathematical and/or logical combination (such as, but not limited to, arithmetic operations, AND, OR, NOT, EQUAL TO, NOT EQUAL TO, LESS THAN, LESS THAN OR EQUAL TO, GREATER THAN, GREATER THAN OR EQUAL TO, etc.) of various plant parameters. For example, states may be defined as:

State 1=((Unit load ranges between 350 and 400 megawatts) AND (Pulverizer A outlet temperature is less than 150 Deg F.) AND (Pulverizer C outlet temperature is greater than 157 Deg F.))
State 2=(Excess oxygen is less than 1.5%)
State 3=(Excess oxygen is greater than 2.5%)
State 4=(Excess oxygen ranges between 1.5 and 2.5%)
State 5=((Ambient Temperature is greater than 80 Deg F.) AND (Pulverizer A coal feed is greater than 75%) AND (Pulverizer B outlet temperature is greater than 150 Deg F.))
State 6=((soot cleaning device group A-I duty cycle is greater than 30) AND (soot cleaning device group B-III duty cycle is less than 25)

Cluster definitions are comprised of any mathematical or logical combination of state definitions and/or various plant parameters. Accordingly, examples of Cluster Definitions may be stated as:

Cluster 1=((State 1) AND (State 2))
Cluster 2=((State 1) AND (State 3))
Cluster 3=((State 1) AND (NOT State 2))
Cluster 4=((NOT State 1) AND (State 3))
Cluster 5=((NOT State 1) OR (State 2))
Cluster 6=((State 1) AND (State 4) AND (State 5))
Cluster 7=((State 4) AND (NOT State 6))

During the data sorting process, each new data record is compared with the various cluster definitions to determine the data cluster(s) into which each record may get stored. Data records that do not satisfy the criteria for any of the cluster definitions can be stored separately. Configuration parameters permit specification of maximum number of data records to retain pertaining to each cluster. Such clustered data and/or relevant historical data may be utilized for retraining neural network model 60. Such a scheme helps retain important data records while culling out the insignificant and/or out-dated ones. The retrained neural network model 60 is utilized for subsequent optimization runs. The maintenance and tracking of the resulting model changes over time may also facilitate diagnostics.

Flow Chart of Soot Cleaning Optimization System

Figure 4A:
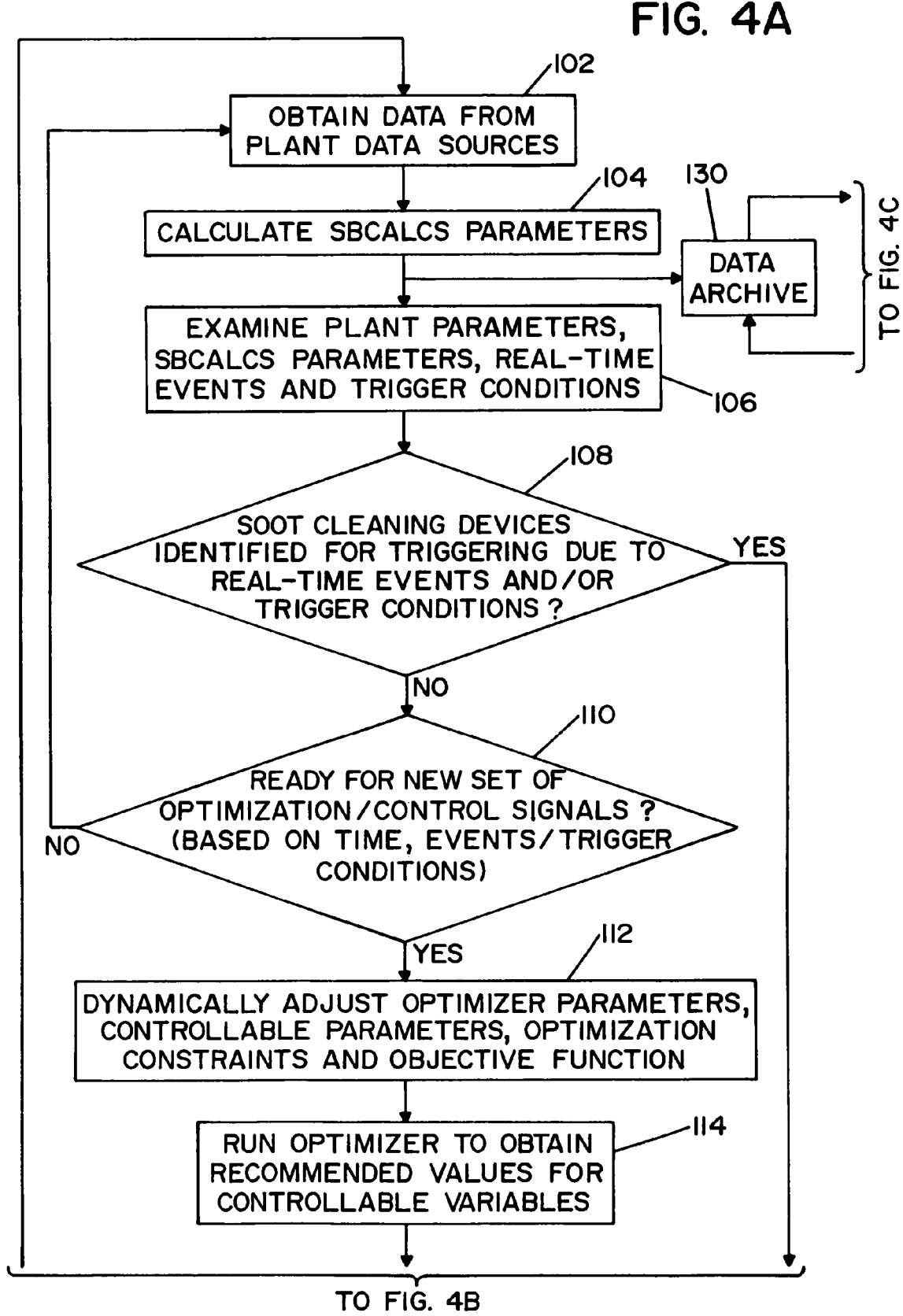
FIGS. 4A-4C illustrate a flowchart describing the operation of the soot cleaning optimization system of FIG. 1, according to an embodiment of the present invention.
Figure 4B:
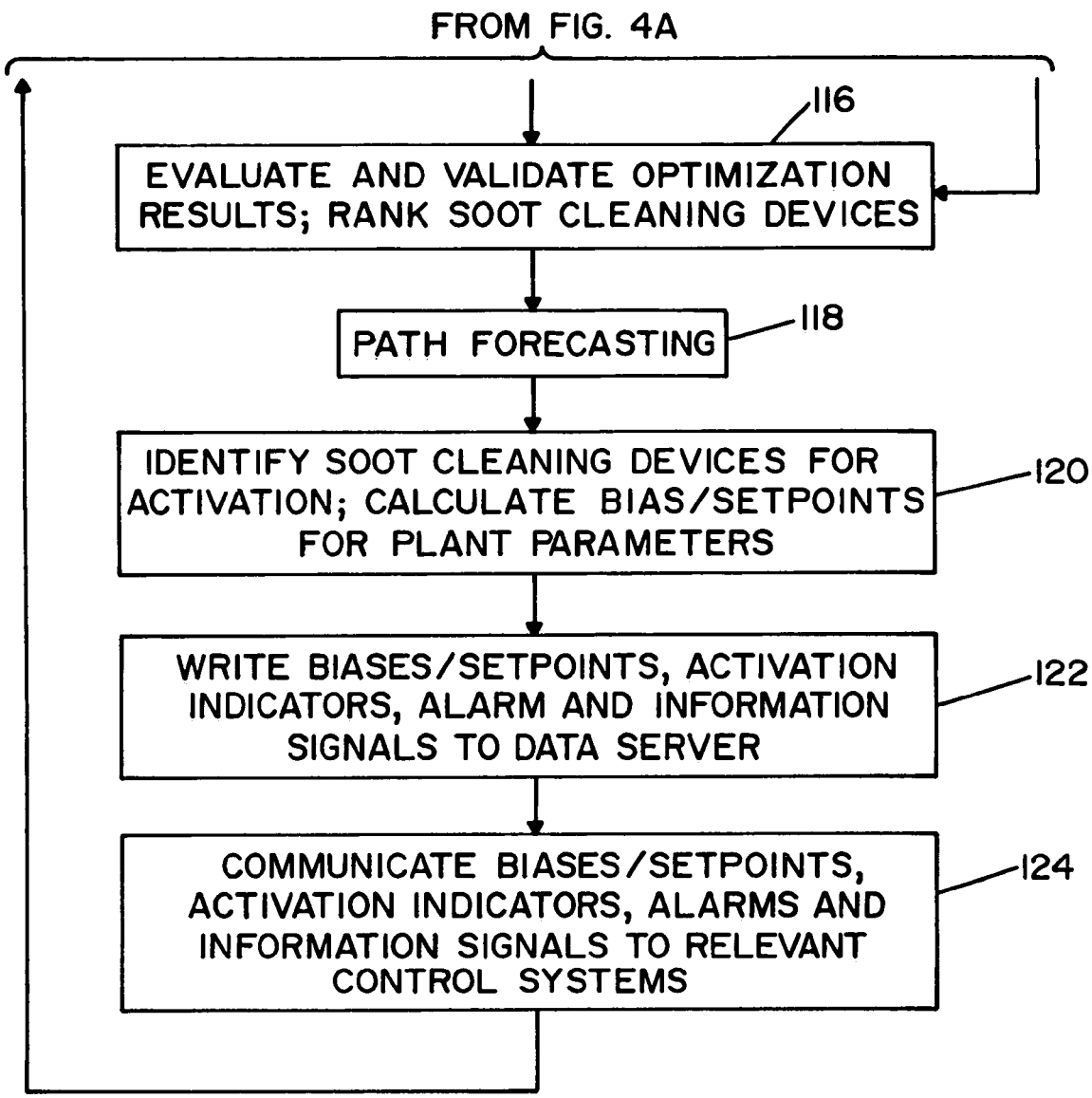
Figure 4C:
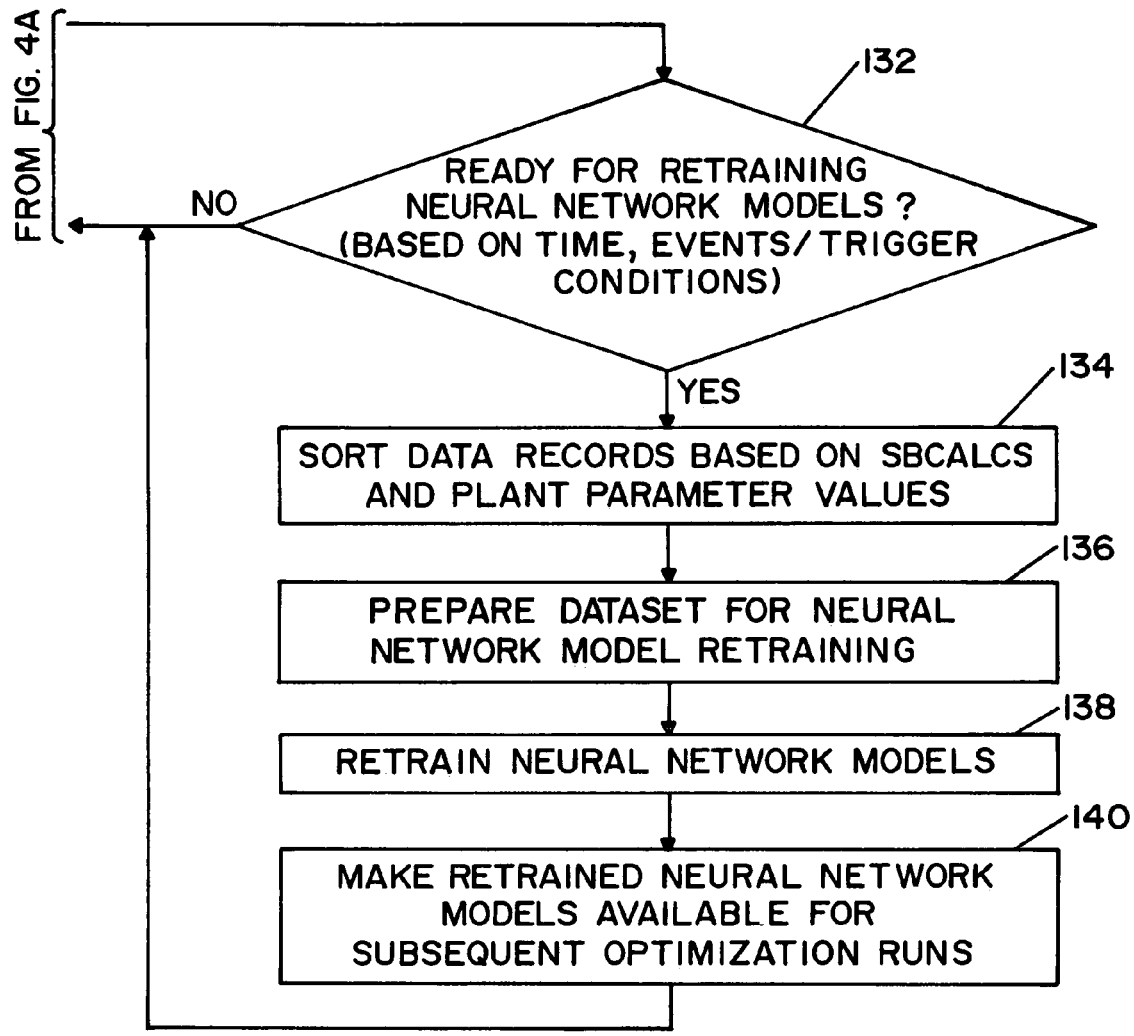

Referring now to FIGS. 4A-4C, there is shown a flow chart illustrating operation of soot cleaning optimization system according to an embodiment of the present invention. At step 102, data is obtained from plant data sources. SBCalcs parameters are calculated at steps 104 and 106. Step 112 describes pre-processing operations, step 114 describes optimization, and step 116 describes post-processing operations. Step 118 describe path forecasting steps that are explained in detail with reference to FIGS. 5 and 6. Steps 120-124 describe further post-processing steps. Steps 132-140 describe retraining of the neural network model (FIG. 4C).

Soot Cleaning Optimization Goals

In accordance with the present invention, numerous sootblowing optimization objectives or goals have been identified. Some of the goals are conflicting and application and/or plant specific. The neural network model output parameters identified above in Table 2 represent one such set of goals. The present invention facilitates the trade-offs between various goals. Optimization goals include, but are not limited to:

Prevent undesirable slagging/fouling—If the deposits are allowed to remain on tube surfaces for an inappropriate time, then inappropriate lower furnace wall slagging or convection pass fouling could occur, leading to shorter intervals between forced shutdown of the power generating unit and lost revenue. Slagging refers to fused deposits or re-solidified molten material that forms primarily on the furnace waterwalls or other surfaces exposed predominantly to radiant heat or high gas temperatures. Fouling refers to bonded (sintered or cemented) ash buildup that occurs predominantly in the convection pass but also in any area where the gas temperature is lower than slag producing temperatures. Importantly, the air preheater (heat exchanger) area and any area where soot cleaning could be active are included in this application. The slag formation phenomenon can result in large clinkers of slag, which may dislodge and fall on boiler surfaces, thereby damaging those surfaces and forcing power generating unit outages for repair work. It is common in the industry that the terms fouling and slagging are often used interchangeably. Soot cleaning optimization system 20 of the present invention evaluates the relationships between SBCalcs parameters and pertinent plant parameters as described above. SBCalcs parameters are then used to select the soot cleaning device(s) for activation. The desired adjustments for relevant plant parameters and the selected soot cleaning device(s) are transmitted to the respective control system(s), to affect undesirable slagging/fouling conditions.

Create desirable slagging/fouling—At start up of a very clean furnace, or as on going practice, it may be desirable to limit or shape heat transfer away from specific sections of the boiler. Thus, it can be desirable to build deposits purposely in certain sections of the power generating unit for either long term or short term benefit.

Minimize unnecessary soot cleaning—If the cleaning media is superheated steam then soot cleaning represents a direct process steam loss. It also leads to an increase in the requirement for demineralized makeup water, which is relatively expensive. In addition, there are associated energy costs with the use of compressed air or water jets. Sootblowing steam represents approximately a significant percentage of total steam production. Unnecessary operation of the soot cleaning equipment leads to increased wear-and-tear and maintenance.

Avoid periodic load reductions for de-slagging—Inappropriate soot cleaning schemes, lead some power generating units to periodically reduce load below a certain level to de-slag the boiler. Reducing the load has the effect of shedding slag due to thermal contraction. Conversely, if it is known the power generating unit will drop load and shed slag, it may be cost effective to delay or skip cleaning as the most cost effective solution.

Minimize/stabilize NOx, or other emissions—Soot and slag buildup causes redistribution/reduction of heat transfer and heat absorption across various sections of the furnace. By effectively managing the soot buildup, better heat transfer/absorption and more effective control of temperature across the furnace exit and convection zones can be achieved. Dynamic adjustment of the air/fuel flow combinations also contribute to reducing NOx. Soot cleaning in the lower furnace may lower the Furnace Exit Gas Temperature (FEGT). This has the desirable effect of reducing thermal NOx, which is an exponential function of local gas temperature. Better coordination between the various plant parameters and soot cleaning activities helps control (and potentially reduce) the back end temperatures, thus altering the boiler's firing characteristics, which could also help minimize emissions.

Maximize heat transfer efficiency—Maximizing heat transfer efficiency between the flue gas and steam/water circuits for all boiler sections reduces the overall fuel requirement to meet a given load demand.

Maximize unit load—It is often desirable to run a unit at maximum capacity to meet process steam, heat and/or electrical power demands. Sub-optimally clean heat exchanger surfaces reduce the maximum achievable load.

Manage particulate matter generation and opacity spikes—ESPs are sensitive to rapid changes in inlet mass concentration as well as total mass loading. Without extreme care and due diligence, excursions or excessive soot can overload an ESP, resulting in high levels of Particulate Matter (PM) being released. PM generation may be reduced by reducing excess carbon, maintaining uniform ESP inlet temperatures, and coordinating Soot cleaning execution with ESP rapping execution. Improved ESP inlet gas temperature is essential to ensure effective ESP performance. Cleaning the boiler convective pass too vigorously may result in stack opacity spikes due to the processing capacity of the ESP being exceeded. This can also result from waiting too long to clean particular sections resulting in excessive particulate matter being blown off when they are cleaned.

Minimize mechanical fatigue, tube erosion, corrosion, thermal stressing—Soot cleaning corresponds to a thermal shock event applied to the heat exchanger metal. If the surface being cleaned is cleaned wrong or is actually clean then tube erosion, buckling and consequent failure can occur. This is a significant concern for units utilizing water cannons or hydrojet technologies to clean furnace waterwalls. Significant thermal stress may also be induced by allowing too large of a blanket to build on certain heat transfer sections. While these sections may not significantly affect the main objectives of for example, heat rate or NOx, if the temperature delta becomes large, a thermal shock may be introduced into the tube when it is cleaned and exposed to furnace temperatures.

Improve heat rate and boiler efficiency—Fouling of the boiler leads to poor efficiencies due to the fact that heat which could normally be transferred to the working fluid remains in the flue gas stream and exits to the environment without beneficial use. This loss in efficiency translates to higher consumption of fuel for equivalent levels of electric generation, which in turn produces even more gaseous emissions. Improving the overall operation of the power plant, combustion characteristics of power generating units, localized temperature consistency and better control of furnace and subsequent heat transfer zone temperatures helps achieve a better heat rate.

Improve the steam temperature transients—Since soot cleaning modifies the distribution of heat transfer in the furnace, this also affects the steam/water temperatures in the various boiler superheater and reheater sections. Improved soot cleaning operation and simultaneous control of plant parameters can help achieve desired levels of steam temperatures while limiting perturbations in extraction steam flow and keeping the spray flows to a minimum control range.

Reduce boiler back-end temperatures—Improved soot cleaning activities and plant parameter control helps increase the heat absorption in the furnace area as well as upper convective pass area which aids in reducing the gas temperatures around economizer outlet area. This has the desirable affect of reduced emissions and improved flue gas conditions for the various post combustion or other systems such as Selective Catalytic Reduction (SCR) systems, Flue Gas Desulfurization systems, Electrostatic Precipitator systems, etc.

Minimize or alter the location of convection pass pressure drops—Increased pressure drop across convection pass sections including the air heater and ESP, is an indicator of the presence of significant fouling. Furthermore, electric fans for maintaining furnace draft experience increased loading and consume more power when gas passages become narrower or get plugged because of fouling. The need for additional auxiliary power creates a need for heat input to maintain the same MW output of the units, which is turn creates further demand for fuel and air, which then again is pushing against the pressure gradient. Hence, this can be a strong negative feedback loop affecting fan loading and unit output and heat rate.

Minimize variance in flue gas excess oxygen—Adjustments to SBCalcs parameters and plant parameters help regulate air and fuel flow combinations in concert with soot cleaning activities. This helps minimize the variance in flue gas excess oxygen. Maintaining the soot and slag at appropriate levels permits combustion optimization systems (COS) to more effectively manage the air and fuel. Furthermore, the operational constraints, real-time events and trigger conditions may be ascertained on the basis of SBCalcs parameters, plant parameters or combinations thereof.

Enhance air preheater soot cleaning—Inappropriate soot cleaning inside the air preheater can cause (a) pluggage of the air heater due to inadequate soot cleaning, or (b) erosion of the surfaces due to excessive cleaning. Downstream systems may also require specific temperatures to be maintained in the flue gas to avoid condensation of acidic or other substances. Control of downstream temperatures may require the correct amount of soot cleaning to maintain certain minimum temperatures for long term, transient conditions, regulations, warranty issues, and efficiencies.

Control or influence ash particle size—Particle size of ash and soot residue down stream of soot cleaning activity can be influenced by the specific characteristics of soot cleaning activity. Introduction of steam vapor into the gas stream as well as the physical interaction with surfaces (heterogeneous chemistry) can be influenced positively and negatively by soot cleaning activity.

Reduce auxiliary power consumption—By better managing the soot cleaning device activation the station service load due to soot cleaning can be reduced. This results in improved capacity and reliability on an individual unit basis, which is of value in alleviating power shortages.

Minimize overall maintenance and operating costs—Contributes to producing power at a lower cost thus increasing profit potential. Optimization considering economic factors is thus a natural fit.

Reduce maximum metal temperatures and thermal cycling—On-line measurement and adjustment of plant parameters and soot cleaning activities help reduce magnitude and frequency of variations.

Avoid unplanned unit outages—Unplanned outages may result due to one or more of the above issues. Such outages lead to increased operation and maintenance costs, lost power generation opportunities and lost revenues. Activating soot cleaning devices when buildup has not yet occurred results in mechanical fatigue, erosion of the tubes, boiler tube failure, and increase in the Equivalent Forced Outage Rate (EFOR). Improvement in the overall power generating unit operating conditions, combustion characteristics and better management of the soot cleaning process helps prevent unplanned outages and related losses. Improvements in fireball position may also reduce forced outage rates and high tube metal temperature alarming within the boiler.

Maintenance/Improvement of plant and combustion conditions for mercury control or mercury specie control—Through real-time feedback and optimal adjustment of the SBCalcs and plant parameters, the soot cleaning optimization system can be tuned to allow the conditions that permit the desired removal of mercury (Hg) or Hg ions. It is known that particle size, fuel type and other plant parameters affect Hg speciation. Furthermore, it is strongly suspect that turbulence, and temperature affect Hg speciation. It is likely other physical parameters of plant conditions also affect the Hg type and Hg flow. Therefore, the interplay between the regulation of SBCalcs parameters and plant parameters permitted by the optimization system can have an impact on the Hg removal. This can also be tied to the electrostatic precipitator performance, where the system works to maintain certain physical conditions, one example being a temperature window. That combined with an optimizer on the electrostatic precipitator system can form a fully integrated system. Each part could work alone to increase Hg removal, as independent subsystems or as multi-part optimization strategy.

In summary, the present invention applies a neural network and optimization technology to optimize for single or multiple (simultaneously) objectives/goals such as reducing harmful environmental emissions and improving the heat rate (efficiency) at fossil-fired power generating units. By improving the heat rate of a boiler, the present invention enables a power plant to generate equivalent amounts of electric energy with decreased fuel input and without changing the physical configuration of the power plant. Neural network and optimization technology facilitates the creation of a model representing the plant process. Such a model is used in conjunction with an optimizer to optimize boiler combustion and/or process performance taking into account various safety, environmental and operational constraints, and/or desires/goals.

Other modifications and alterations will occur to others upon their reading and understanding of the specification. It is intended that all such modifications and alterations be included insofar as they come within the scope of the invention as claimed or the equivalents thereof.

The invention claimed is:

1. A method for optimizing operation of a power generating plant having a plurality of power plant device groups, each power plant device group comprised of one or more power plant devices, the method comprising:
   evaluating the results of an optimization process for identifying a power plant device group for activation;
   for each power plant device group, determining a target factor value for at least one associated time value parameter, wherein the greater the target factor value, the higher the rank of the power plant device group;
   comparing the target factor value to predefined threshold ranges to determine a respective weight value for each power plant device group, wherein each weight value is respectively associated with one of the following operating conditions:
   (a) do not activate power plant devices in the power plant device group,
   (b) may not activate power plant devices in the power plant device group,
   (c) may activate power plant devices in the power plant device group, and
   (d) activate power plant devices in the power plant device group;
   determining a plurality of decisions D of an initial time increment ($t_0$) in accordance with the determined weight values, wherein each said decision D is associated with a discrete variable having a finite set of possible values for operation of one of the power plant device groups;
   obtaining a model of the power generating plant that predicts one or more output parameter values that are a function of one or more input parameter values of the power generating plant, the output parameter values are associated with goals in operation of the power generating plant, wherein optimized input parameter values are determined by iteratively varying one or more input parameter values received by the model until the predicted output parameter values are substantially equal to said goals;
   determining one or more subsequent decisions D of one or more subsequent time increments after the initial time increment ($t_0$), in accordance with optimized input parameter values that are determined using said model;
   selecting one of said decisions D determined for the initial time increment ($t_0$) as a decision for operation of the power generating plant at the initial time increment ($t_0$), wherein said selection is based upon analysis of the output parameter values obtained in connection with each of said decisions D of the initial time increment and the output parameter values obtained in connection with each said subsequent decisions D of the one or more subsequent time increments; and
   operating a power plant device group of the power generating plant for the initial time increment in accordance with the selected decision D, wherein said power plant devices include a soot cleaning device.

2. A method according to claim 1, wherein said at least one discrete variable has a value of ON or OFF with respect to activation of said power plant device group.

3. A method according to claim 1, wherein said method further comprises:
   determining whether each decision D will violate any rules or constraints associated with operation of said power generating plant.

4. A method according to claim 1, wherein said plurality of power plant device groups include soot cleaning device groups, wherein each soot cleaning device group includes one or more soot cleaning devices.

5. A method according to claim 1, wherein said decisions D for the time increments form a decision tree.

6. A method according to claim 1, wherein said method further comprises:
   ranking said decisions D for each time increment, wherein said rank is associated with achievement of a desired goal for the power generating plant.

7. A system for optimizing operation of a power generating plant including a plurality of power plant device groups, each power plant device group comprised of one or more power plant devices, the system comprising:
   means for evaluating the results of an optimization process for identifying a power plant device group for activation;
   means for determining a target factor value for at least one associated time value parameter, for each power plant device group, wherein the greater the target factor value, the higher the rank of the power plant group;
   means for comparing the target factor value to predefined threshold ranges to determine a respective weight value for each power plant device group, wherein each weight value is respectively associated with one of the following operating conditions:
   (a) do not activate power plant devices in the power plant device group,
   (b) may not activate power plant devices in the power plant device group,
   (c) may activate power plant devices in the power plant device group, and
   (d) activate power plant devices in the power plant device group;
   means for determining a plurality of decisions D of an initial time increment ($t_0$) in accordance with the determined weight values, wherein each said decision D is associated with a discrete variable having a finite set of possible values for operation of one of the power plant device groups;
   a model of the power generating plant that predicts one or more output parameter values that are a function of one or more input parameter values of the power generating plant, the output parameter values are associated with goals in operation of the power generating plant, wherein optimized input parameter values are determined by iteratively varying one or more input parameter values received by the model until the predicted output parameter values are substantially equal to said goals;
   means for determining one or more subsequent decisions D of one or more subsequent time increments after the initial time increment ($t_0$), in accordance with optimized input parameter values that are determined using said model;

means for selecting one of said decisions D determined for the initial time increment ($t_0$) as a decision for operation of the power generating plant at the initial time increment ($t_0$), wherein said selection is based upon analysis of the output parameter values obtained in connection with each of said decisions D of the initial time increment and the output parameter values obtained in connection with each of said subsequent decisions D of the one or more subsequent time increments; and means for operating the power generating plant for the initial time increment in accordance with the selected decision D, thereby optimizing operation of the power generating plant, wherein said power plant devices include a soot cleaning device.

8. A system according to claim 7, wherein said discrete variable has a value of ON or OFF with respect to activation of said power plant device group.

9. A system according to claim 7, wherein said system further comprises:
means for determining whether each decision D will violate any rules or constraints associated with operation of said power generating plant.

10. A system according to claim 9, wherein said plurality of power plant device groups include soot cleaning device groups, wherein each soot cleaning device group includes one or more soot cleaning devices.

11. A system according to claim 7, wherein said decisions D for the time increments form a decision tree.

12. A system according to claim 7, wherein said system further comprises:
means for ranking each of said decisions D for each time increment, wherein said rank is associated with achievement of a desired goal for the power generating plant.

13. A method according to claim 4, wherein said input parameter values are associated with at least one time value parameter for operation of each soot cleaning device group, and at least one plant parameter.

14. A method according to claim 13, wherein said at least one time value parameter is selected from the group consisting of:
(1) a DutyCycle parameter representative of a total duration of time for which soot cleaning devices in a soot cleaning device group were active within a defined time period;
(2) an OffTime parameter representative of a total duration of time for which soot cleaning devices in a soot cleaning device group were inactive;
(3) an OnTime parameter representative of a total duration of time for which soot cleaning devices in a soot cleaning device group were active;
(4) a MaxOffTime parameter representative of a maximum total duration of time for which soot cleaning devices in a soot cleaning device group may be left inactive subsequent to a soot cleaning operation; and
(5) a MinOffTime parameter representative of a minimum total duration of time for which soot cleaning devices in a soot cleaning device group should be kept inactive subsequent to a soot cleaning operation.

15. A method according to claim 13, wherein said at least one plant parameter is selected from the group consisting of: combustion parameters, fuel parameters, post-combustion parameters, emissions parameters, performance parameters, given conditions and state indicators.

16. A method according to claim 1, wherein said output parameter values are associated with the group consisting of: NOx emission, heat rate, and boiler efficiency.

17. A method according to claim 1, wherein said method further comprises the step of:
dynamically adjusting the desired goals associated with said one or more output parameter values.

18. A method according to claim 4, wherein said method further comprises:
ranking the decisions D in accordance with a predetermined criteria, said ranking includes the steps of:
determining for each soot cleaning device group an associated DutyCycle parameter value (Opt Result) associated with said adjusted input parameters;
determining for each soot cleaning device group a current DutyCycle parameter value (CurrentValue); and
determining for each soot cleaning device group an optimization cycle time value (OptCycleTime).

19. A method according to claim 18, wherein said step of ranking the decisions D in accordance with the predetermined criteria further comprises:
determining a Target Factor by the following expression:

Target Factor=(OptResult−CurrentValue)/ OptCycleTime.

20. A system according to claim 10, wherein said input parameter values are associated with at least one time value parameter for operation of each soot cleaning device group, and at least one plant parameter.

21. A system according to claim 20, wherein said at least one time value parameter is selected from the group consisting of:
(1) a DutyCycle parameter representative of a total duration of time for which soot cleaning devices in a soot cleaning device group were active within a defined time period;
(2) an OffTime parameter representative of a total duration of time for which soot cleaning devices in a soot cleaning device group were inactive;
(3) an OnTime parameter representative of a total duration of time for which soot cleaning devices in a soot cleaning device group were active;
(4) a MaxOffTime parameter representative of a maximum total duration of time for which soot cleaning devices in a soot cleaning device group may be left inactive subsequent to a soot cleaning operation; and
(5) a MinOffTime parameter representative of a minimum total duration of time for which soot cleaning devices in a soot cleaning device group should be kept inactive subsequent to a soot cleaning operation.

22. A system according to claim 20, wherein said at least one plant parameter is selected from the group consisting of: combustion parameters, fuel parameters, post-combustion parameters, emissions parameters, performance parameters, given conditions and state indicators, 23. A system according to claim 7, wherein said output parameter values are associated with the group consisting of: NOx emission, heat rate, and boiler efficiency.

24. A system according to claim 7, wherein said system further comprises:
means for dynamically adjusting the desired goals associated with said one or more output parameter values.

25. A system according to claim 10, wherein said system further comprises means for ranking the decisions D in accordance with a predetermined criteria, said means for ranking includes:

means for determining for each soot cleaning device group an associated DutyCycle parameter value (Opt Result) associated with said adjusted input parameters;

means for determining for each soot cleaning device group a current DutyCycle parameter value (CurrentValue); and means for determining for each soot cleaning device group an optimization cycle time value (OptCycleTime).

26. A system according to claim 25, wherein said means for ranking the decisions D in accordance with the predetermined criteria further comprises:

means for determining a Target Factor by the following expression:

$$\text{Target Factor} = (\text{OptResult} - \text{CurrentValue})/\text{OptCycleTime}.$$

* * * * *